Dec. 31, 1963 P. W. PIERCE 3,115,760
METHOD AND MACHINE FOR KNITTING SEAMLESS GLOVES
Filed Aug. 23, 1960 9 Sheets-Sheet 1
Fig. 1.
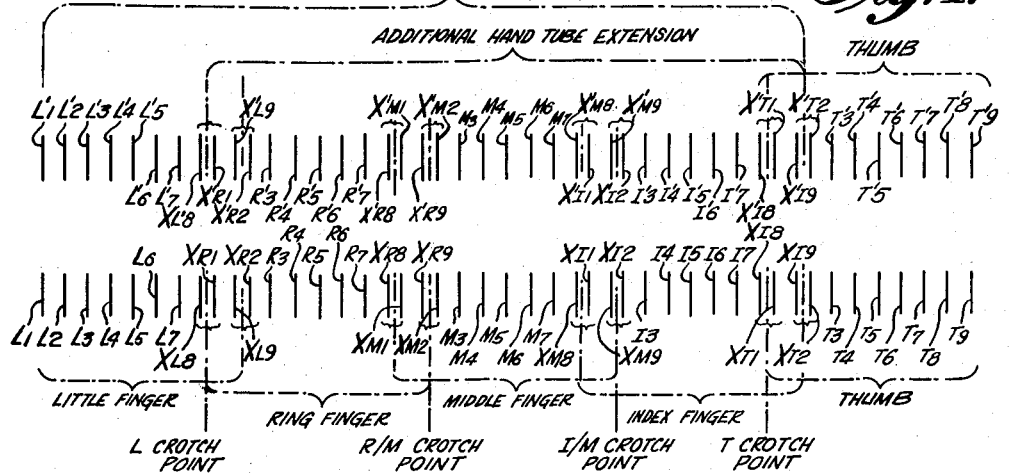
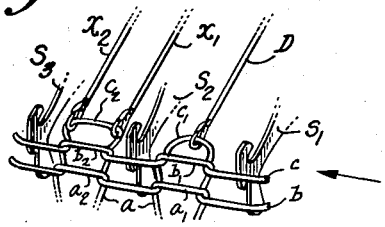
Fig. 2a
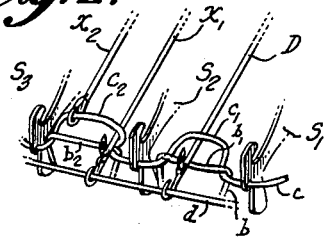
Fig. 2b
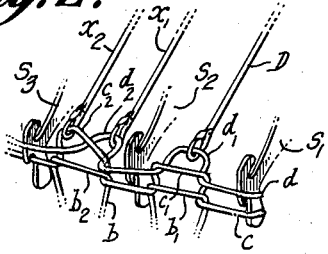
Fig. 2c
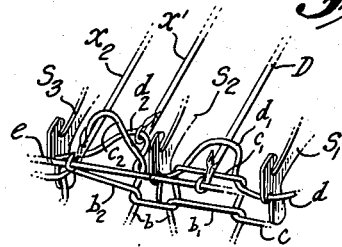
Fig. 2d
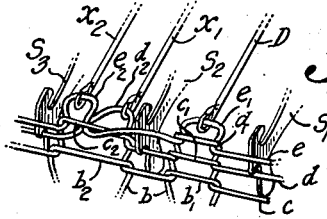
Fig. 2e
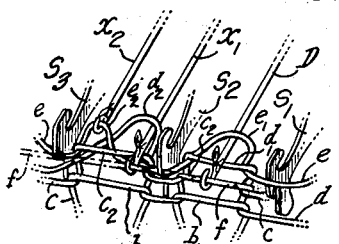
Fig. 2f
INVENTOR
PENN W. PIERCE
BY Watson, Cole, Grindle & Watson
ATTORNEYS Dec. 31, 1963  P. W. PIERCE  3,115,760
METHOD AND MACHINE FOR KNITTING SEAMLESS GLOVES
Filed Aug. 23, 1960  9 Sheets-Sheet 2
Fig. 3.ª
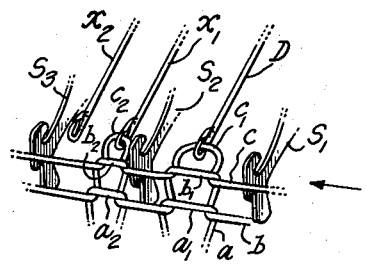
Fig. 3.ᵇ
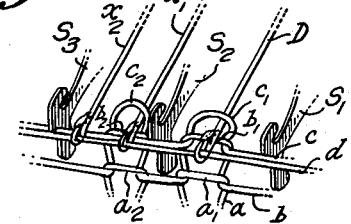
Fig. 3.ᶜ
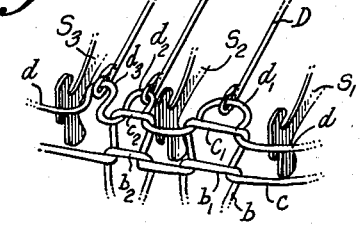
Fig. 3.ᵈ
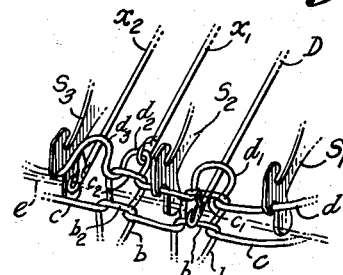
Fig. 3.ᵉ
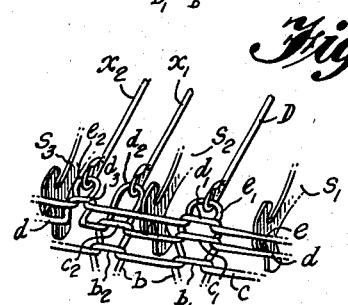
Fig. 3.ᶠ
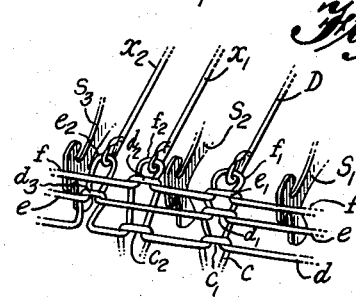
Fig. 4.
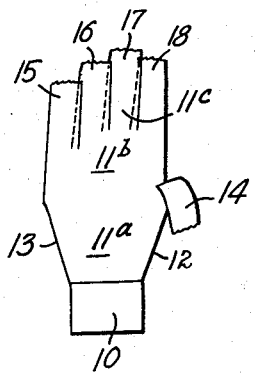
INVENTOR
PENN W. PIERCE
BY Watson, Cole, Grindle & Watson
ATTORNEYS

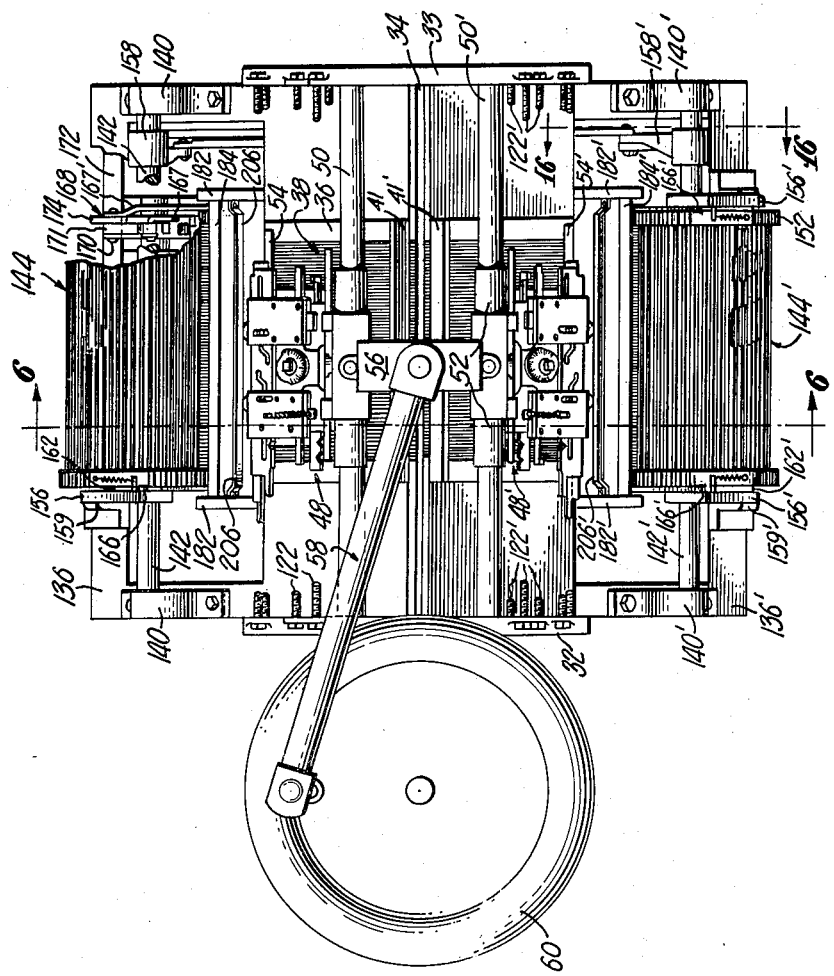

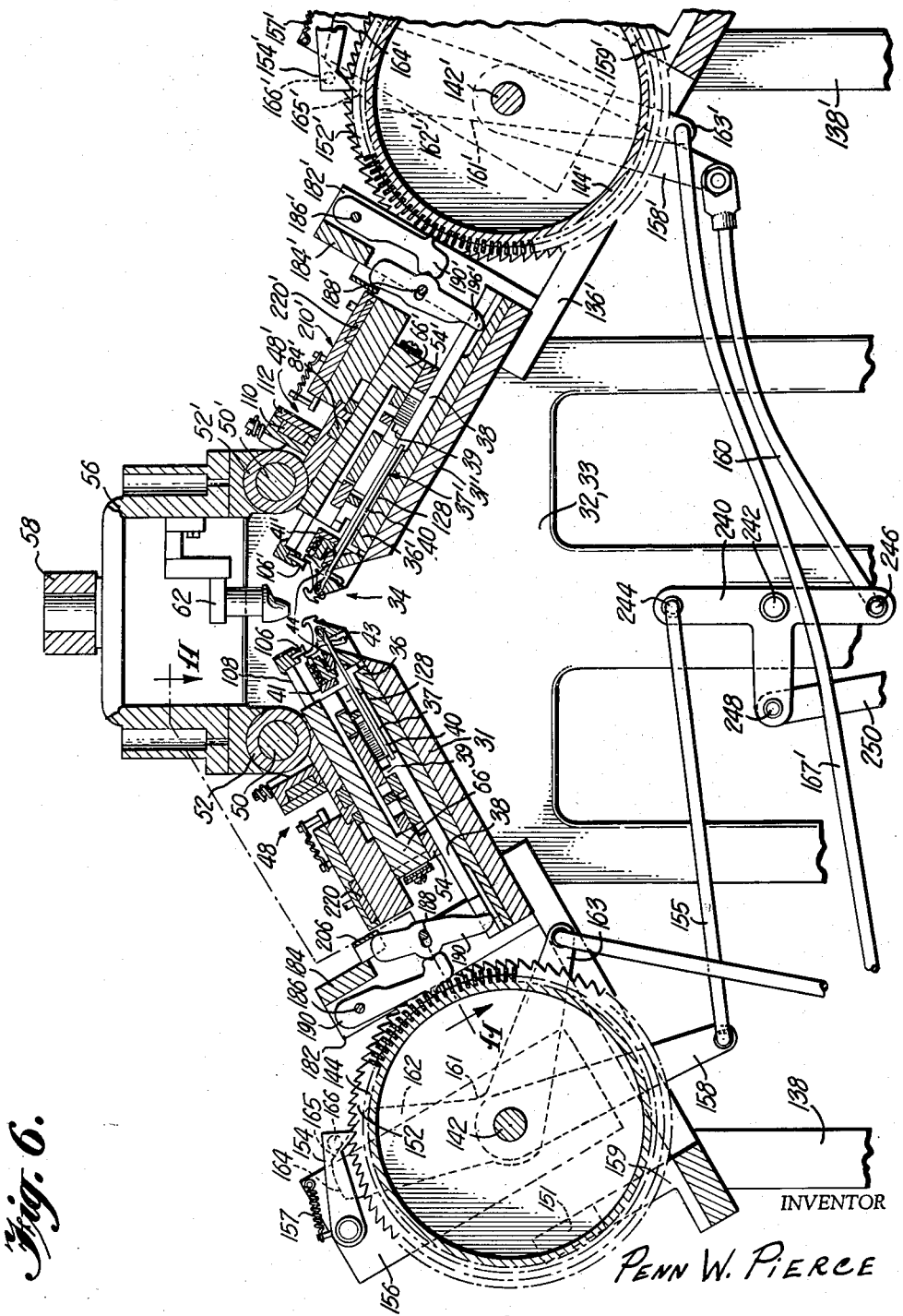

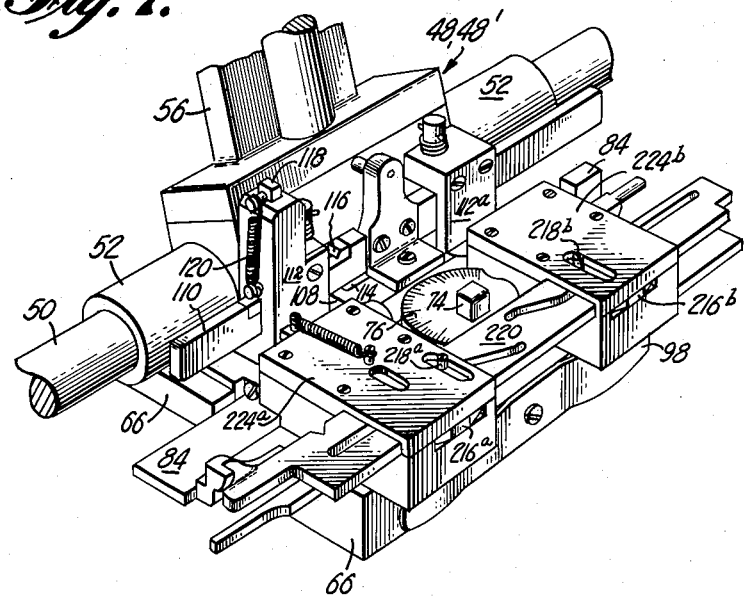

Dec. 31, 1963  P. W. PIERCE  3,115,760
METHOD AND MACHINE FOR KNITTING SEAMLESS GLOVES
Filed Aug. 23, 1960  9 Sheets-Sheet 6
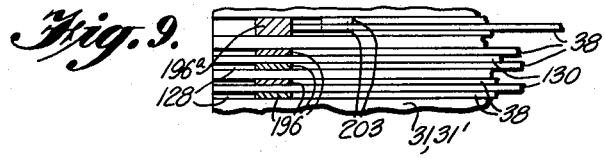
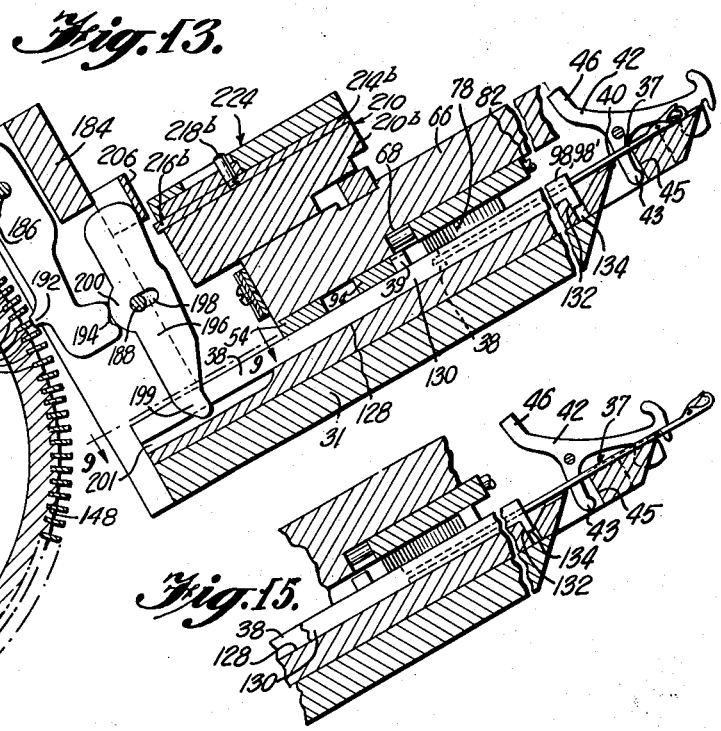
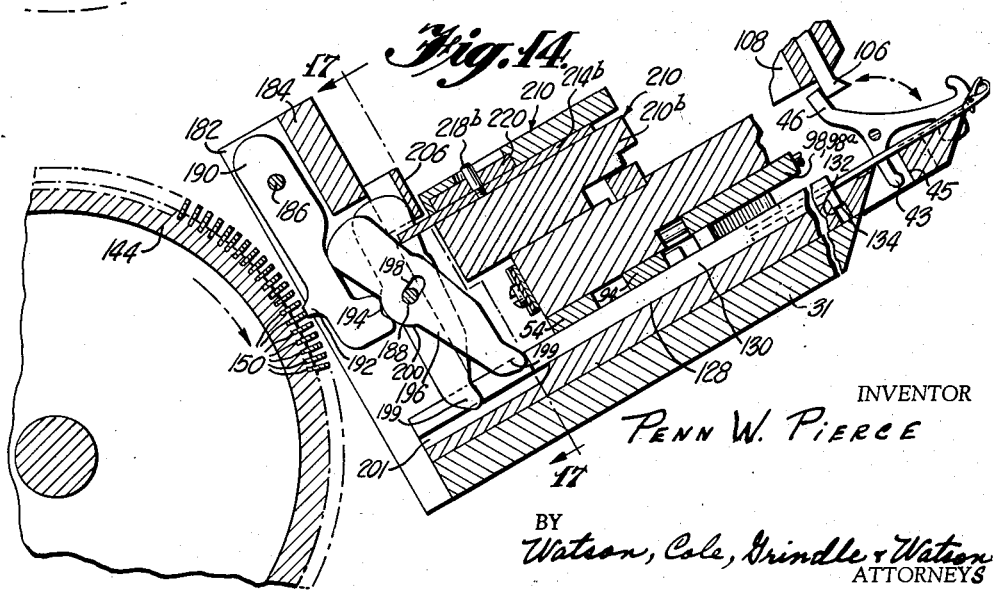
INVENTOR
PENN W. PIERCE
BY
Watson, Cole, Grindle & Watson
ATTORNEYS

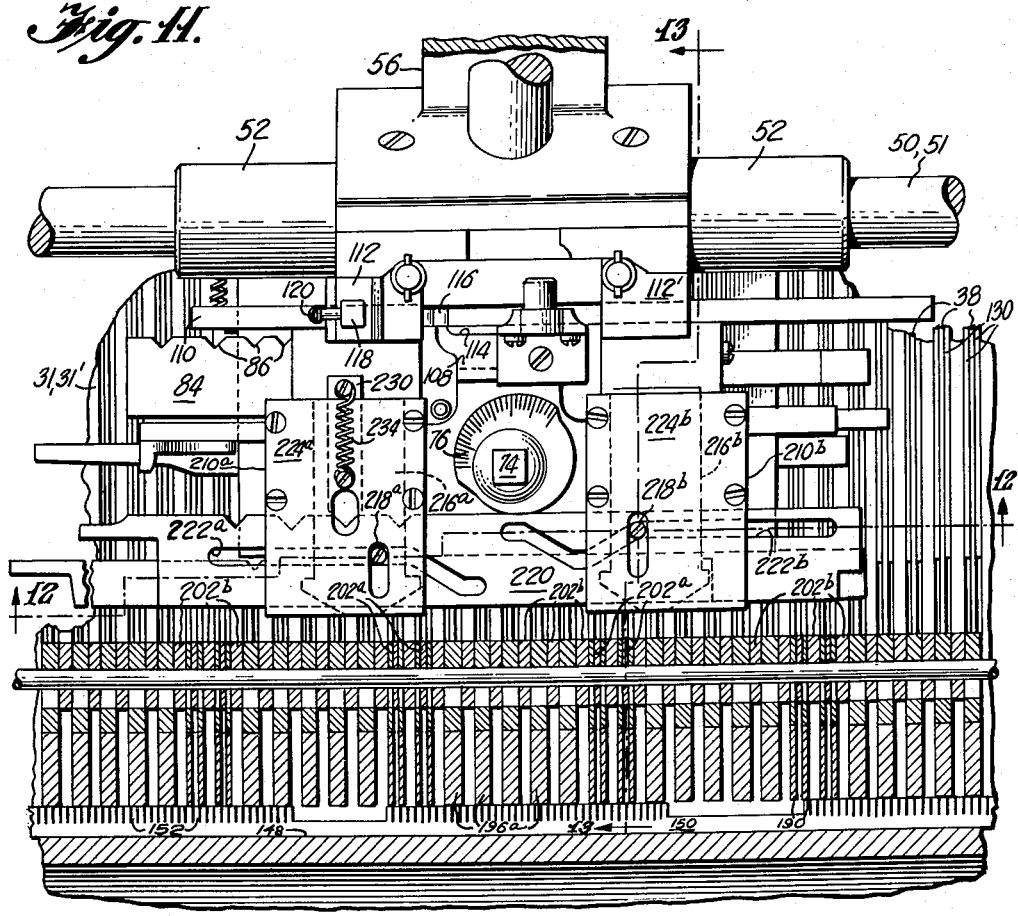
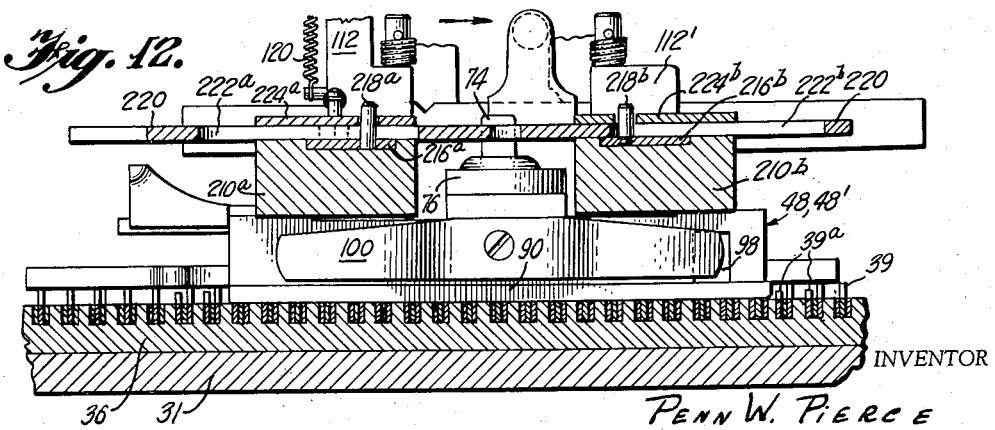

Dec. 31, 1963   P. W. PIERCE   3,115,760
METHOD AND MACHINE FOR KNITTING SEAMLESS GLOVES
Filed Aug. 23, 1960   9 Sheets-Sheet 8

INVENTOR
PENN W. PIERCE
BY
Watson, Cole, Grindle & Watson
ATTORNEYS

Dec. 31, 1963 P. W. PIERCE 3,115,760
METHOD AND MACHINE FOR KNITTING SEAMLESS GLOVES
Filed Aug. 23, 1960 9 Sheets-Sheet 9

INVENTOR
PENN W. PIERCE

BY Watson, Cole, Grindle & Watson
ATTORNEY

United States Patent Office 3,115,760
Patented Dec. 31, 1963

3,115,760
METHOD AND MACHINE FOR KNITTING
SEAMLESS GLOVES
Penn W. Pierce, Orlando, Fla., assignor to
Ralph C. Powell, Spartanburg, S.C.
Filed Aug. 23, 1960, Ser. No. 51,334
27 Claims. (Cl. 66—65)

This invention relates to the field of seamless gloves and is concerned more particularly with an improved method and apparatus of knitting gloves of this type.

In U.S. Patent 2,418,957 issued to Eric Simmat on April 15, 1947, there was disclosed and claimed a basic new method for continuously knitting a seamless tubular glove having a fashioned hand portion and stepped-level finger tube extensions. The knitting machine disclosed by Simmat as suitable for the practice of his method is the so-called straight bar machine, more often referred to as the Lamb knitting machine. Experimentation with the Simmat method revealed that gloves produced in accordance therewith were subject to openings or gaps at the very bottom of the finger and thumb crotches and it was to correct this defect that the method disclosed in Powell Patent 2,877,635 issued March 17, 1959, for "Method and Machine for Knitting Seamless Gloves" was concerned. In accordance with that method, as the courses forming the extreme base of the fingers are knitted, the yarn is crossed over from one bed of needles to the other so as to provide one or more intersecting cross-overs of yarn derived from one or more courses of yarn at each of the crotches between adjacent fingers and the thumb and palm. To explain more fully, by passing the yarn from the front face of one finger, for example, to the rear face of the adjacent finger, and then from the front face of the adjacent finger to the rear face of the next finger, little X's of yarn are formed between the fingers and between the thumb and palm portion at the bases thereof to close off the openings or gaps that would otherwise be present there.

It will be seen that where these X's of yarn are provided in a plurality, say three courses of knitting at the bases of the fingers and thumb, there is formed, in effect, a small web across the crotches very much resembling the web of skin between adjacent fingers or the thumb and palm of the human hand. While the presence of such webs quite effectively accomplished the desired purpose of closing off the openings in gloves of the Simmat patent, further development has shown that these webs are objectionable in certain cases, particularly where a tight-fitting glove is desired, in that they tend to constrict the finger openings at their bases causing the gloves to be somewhat less comfortable to some wearers.

It is therefore the principal object of the present invention to provide an improved method for continuously knitting seamless gloves in which additional fullness is obtained at the bases of the finger extensions without the presence of openings at the finger crotches as well as to provide a machine capable of carrying out such a method.

A further object of the invention is a method of knitting seamless tubular gloves in which additional wales of knitted yarn are introduced at the bases of the fingers as well as the thumb, if desired, adjacent the crotches thereof, whereby the total number of wales present in the fingers is in excess of the total number of wales present in the hand portion of the glove, the new wales being introduced without any interruption in the knitting operation.

Another object of the invention is a continuous method of knitting a seamless tubular glove having the fingers thereof overlapping at their bases to the extent of one or more wales whereby the size of the finger openings is greater than would otherwise be possible.

A still further object of the present invention is to modify a knitting machine of the straight bed or Lamb type to enable the heretofore described method to be carried out thereon.

A still further object of the present invention is a straight bed knitting machine having additional needles at at least the points along the beds thereof corresponding to the crotches of gloves to be produced thereon and including a patterning mechanism capable of individually controlling the operation of the needles in the beds.

An additional object is a knitting machine having at least some of its needle grooves enlarged with two slightly spaced apart needles arranged in each of the enlarged grooves, and including means for operating said needles independently and as a unit.

These and other objects of the invention will appear as the following detailed description is read in conjunction with the annexed drawings in which:

FIG. 1 is a diagrammatic view of a series of knitting needles, only the upper or hook ends of which are shown, arranged in two rows as in a Lamb machine for the practice of the method of the present invention, pairs of double needles being indicated by small parentheses;

FIGS. 2A–2F are a sequence of perspective views of the hook ends of a pair of double needles, an adjacent single needle, and the forward portion of associated sinkers, showing the manipulation of these components during the knitting of courses of yarn in accordance with a preferred embodiment of the method hereof;

FIGS. 3A–3F are a sequence of views similar to FIGS. 2A–2F, illustrating an alternative method of knitting;

FIG. 4 is a schematic view of a completed glove knitted in accordance with the invention.

FIG. 5 is a to plan view of a straight bed of Lamb knitting machine adapted for the practice of the method of the invention;

FIG. 6 is a side elevation in cross section of the upper portion of the knitting machine of FIG. 5 taken substantially along line 6—6 of FIG. 5;

FIG. 7 is a view in perspective of one of the knitting heads of the machine in association with supporting components;

FIG. 8 is a bottom plan view of the knitting head of FIG. 7;

FIG. 9 is a fragmentary plan view taken substantially along line 9—9 of FIG. 13 looking down on the rear end of a needle bed and showing certain kicker fingers in cross-section;

FIG. 10 is a perspective view of a needle cam in inverted position with the butts of a pair of double needles in operative position with respect thereto, showing the butts being actuated as a unit;

FIG. 11 is an enlarged detailed view taken partially in cross-section along line 11—11 of FIG. 6, showing the knitting head and adjacent portion of one needle bed in plan and a portion of the needle actuating and control mechanism in section;

FIG. 12 is an enlarged detail view taken substantially along line 12—12 of FIG. 11, showing the knitting head partially in rear elevation and partially in section and the needle bed in section;

FIG. 13 is an enlarged detail view taken in section along line 13—13 of FIG. 11 through the needle patterning and pre-setting mechanism, the needle bed and the knitting head with a positioning finger and a kicker finger pre-set in operative position by the pattern cylinder but with the kicker finger actuating cam in inoperative position;

FIG. 14 is a view similar to FIG. 13 showing the kicker finger actuating cam in operative position and in the act of actuating a kicker finger to raise the corresponding needle to needle cam engaging position;

FIG. 15 is a fragmentary view similar to a portion of FIGS. 13 and 14, showing the needle fully extended by the needle cam to engage a new thread;

THE METHOD OF THE INVENTION

Figure 16:
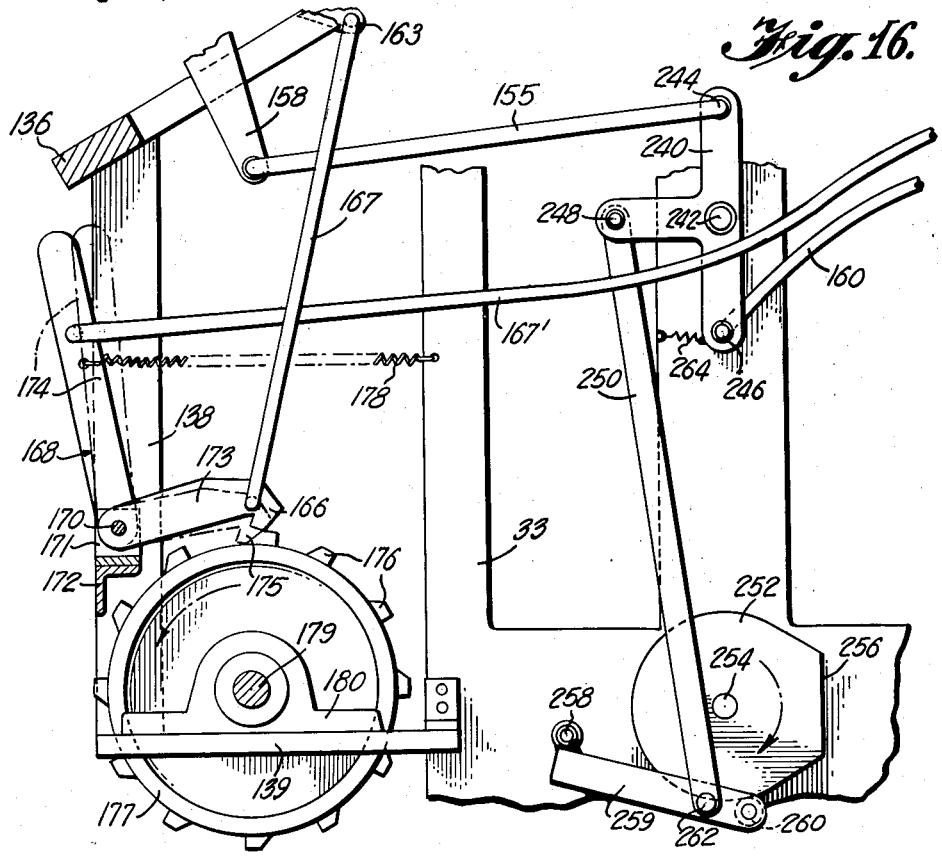
FIG. 16 is a view principally in side elevation of the actuating mechanism for effecting step-by-step rotation of the pattern cylinder.

A. General Description (1) *Broad concept and brief statement of variations.*—The method of the invention is particularly adapted for the knitting of a glove having at least one crotch point located between two adjacent tubular extensions and will be generally described in this context. While there are several specific embodiments in which the method can be practiced, in essence, the method can be characterized as providing on each bed adjacent groups of single needles corresponding to the tubular extensions to be knitted and at least one pair of double needles between the adjacent groups of single needles at points coinciding with aforesaid crotch point of the glove; knitting the portions of the glove up to each of the levels at which crotch points occur and preparatory to beginning of the first tubular extension to be knitted on one side of the first crotch point at that level forming at least a half-stitch on each needle of the pairs of the double needles located at that level; forming the first tubular extension by knitting on each bed the group of needles corresponding to the first tubular extension plus a needle of each pair of double needles located at the first crotch point, one of the double needles that is knitted at this crotch point on each bed being separated from the group of single needles that is knitted on the same bed by another needle of the double needles located at that crotch point, the other needles of said pairs of double needles, including the needles intervening between said groups of single needles and those of the pairs of double needles knitted therewith, being maintained inactive, i.e. disengaged from the knitting operation, to hold stitches, i.e. at least half-stitches, thereon until the first tubular extension is completed; casting off the stitches of the last course of the first tubular extension from the needles on which they were knitted and thereafter maintaining said needles thus rendered free of stitches inactive; and forming the second tubular extension by knitting courses of yarn utilizing on each bed the group of needles corresponding to said second extension plus all of the double needles which at that crotch point were maintained inactive as the first tubular extension was formed, enough of such courses being added to complete said second extension, all of said steps being carried out continuously.

As will appear more clearly from the description of the machine, the term "pair of double needles" is used herein to denote two needles arranged on the same bed in closely spaced relationship, i.e. closer than is used on Lamb machines, without an intervening sinker and preferably arranged in a single slot with a thin removable spacer element therebetween, which slot is enlarged for this purpose.

Normally, the glove to be knitted will have several crotch points, some of which may be located at different levels transversely of the glove, i.e. the thumb crotch point and little finger crotch point, and some of which may be located at the same level, i.e. the crotch points between the ring and middle and between the middle and index fingers. With respect to the former, the tubular hand portion of the glove must be extended up to the level of the next crotch point, in which event the hand portion extension may be the second tubular extension in the sense of the above characterization, and the process is repeated for these additional crotch points, the only difference being that the last course of such hand extensions is not cast off from the needles but retained thereon as a foundation for knitting further extensions for the digits of the hand. Where there are three or more digit extensions having their crotch points at the same level, the first tubular extension to be knitted when the common level of these crotch points is reached must be at one end or the other of those extensions remaining to be knitted, and as that extension is completed the needles used therein are cast free of stitches, after which the extension next adjacent the first is formed in the same manner as the first, the stitches cast off from the needles used therein and the last extension formed and cast off. In the first course of the second extension in such a case, steps must be taken to form the crotch point on the other side thereof which is done by manipulating the needles of the pairs of double needles at the crotch point on such other side in the same manner as was done in connection with the courses of the first extension. The same is true with respect to the third extension if there be four extensions with their crotch points at the same level. Furthermore, where there are at the same level two or more crotch points for three or more digit extensions, the manipulation of the pairs of double needles at these crotch points in preparation for the addition of the digit extensions may be done simultaneously so that all of the needles of the pairs of double needles disposed at the crotch points having a common level will bear at least half-stitches thereon at the time of the beginning of the first course of the first digit extension to be formed at this level.

It is not essential that a thumb be knitted or, if knitted, that the principles of the invention be used in connection therewith. During the construction of hand portions of the glove, including extensions of the hand portion, all of the pairs of double needles within the confines of or encompassed by, the hand portion being constructed may be knit as single needles, i.e. each pair knit as a unit to draw a single common stitch, in which case, a half-stitch is automatically formed on each needle of each pair; or special provision may be made to form distinct full stitches individually thereon just prior to the knitting of the base courses of the extensions at each level. Alternatively, only one needle of each of such pairs of double needles may be knitted during the construction of the portions of the glove up to each of the levels of the crotch points, and the pairs of double needles at that point knitted as units during at least the last course of the hand portion knitted to place half-stitches on each needle of the double needles; or special provision may again be made to place distinct full stitches individually on each needle of each pair preparatory to beginning an extension at each level. The term "half stitch" is used herein to mean a loop or U-shaped bend of yarn which has been drawn by a needle but in the absence on that needle of a loop forming a part of a prior course of yarn, through which prior loop the latter loop would normally be drawn to form what is deemed here to be a "full stitch." The phrase "at least a half stitch," or at times merely the term "stitch," is intended to be inclusive of both a "half stitch" and a "full stitch."

Where a pair of double needles is knitted as a unit to draw a single common stitch, each needle is considered to have a half stitch thereon even though the single stitch may be drawn through a previous common stitch formed by knitting the pair as a unit in a previous course. The reason for this will appear in connection with the description of FIGS. 2A–2F. Where a pair of double needles is knitted as a unit to draw a "single stitch," but one of the pair has been knitted in a previous course alone and carries a ful stitch thereon through which a part of the "single stitch" is pulled, the previously knitted needle is considered to have a full stitch thereon and the needle knitted for the first time to have a half stitch thereon. The reason for this will appear in connection with the description of FIGS. 3A–3F.

(2) *General considerations.*—In general, there are two types of gloves classified by the placement of the thumb, namely, a side thumb and an inset thumb. In the former, the thumb extends from one side of the palm portion and can be worn on either hand. Such a glove is illustrated in the Simmat Patent No. 2,418,957 and is formed by knitting the thumb as a tubular extension, in addition to the finger tube extensions, during the continuous knitting operation. In the latter, the thumb is produced separately and is inset into one side of the palm portion by a special technique known in the art, the glove so constructed being limited in use to a particular hand of the wearer. With gloves of the first type, the principles of the invention can be applied to the formation of the thumb, which represents the most complete usage of the invention and is preferred for this reason. In this case, there is allocated for the thumb an additional group of needles in each needle bed at one end of the needles allocated for the fingers, the crotch point between the thumb and hand or palm portions qualifying as a "crotch point" in the sense that this term is employed in this specification and the annexed claims, and the steps of the Simmat patent or Powell Patent No. 2,418,957 are in general followed knitting the hand portion until a level at or adjacent the thumb is reached. If desired, however, the thumb can be formed in other known ways, the invention then being confined to the crotches of the fingers, in which case the usage of the invention is similar to that for inset thumb gloves except that a group of needles for the thumb is necessary and is knitted in such known ways. For the inset thumb glove, there are allocated needles only for the several finger tube extensions, the hand portion being knitted in a conventional way, during which provision is made for insertion of the thumb, until a level at or adjacent the base of the first finger tube to be knitted, normally the little finger, is reached. Since the thumb tube is formed separately in this case, only the crotch points between the several finger tube extensions are of concern in the present method.

It is an inherent characteristic of the invention that pairs of double needles shall be provided at the points on the needle bed that would normally coincide with the locations of the crotch points to which the invention is to be applied and, preferably, each pair occupies a single enlarged slot. Most advantageously, pairs of double needles are provided in each of two slots at each crotch point, one slot on each side of the normal crotch point, although one pair at each point or more than two pairs arranged symmetrically will serve, subject to a minor change in order of needle manipulation in the case of only one pair, as will be explained, and subject to somewhat greater possibility of the yarn becoming fouled in the case of three or more pairs. The use of two pairs at each crotch point has been found to afford the needed increase in effective size of the finger openings as well as to be relatively free of operational difficulties and is, consequently, recommended.

Between and at the ends of the slots containing pairs of double needles will, of course, be groups of slots each containing a single operative needle. That is to say, in the event the slots in these groups contain pairs of double needles, one needle thereof is disengaged during the entire knitting operation and, in effect, may be considered as absent. These groups of slots and the operative needles they contain correspond with the number and arrangement of the tubular extensions for the digits of the hand in the glove to be knitted.

With these background considerations disposed of, attention may now be given to the general description of the several embodiments of the method of the invention.

(3) *Preferred embodiment of method.*—In accordance with the preferred embodiment, all of the pairs of double needles are actuated as units, i.e., each pair of double needles is knitted as a single needle, along with the groups of single needles for the digits up until the level of the first extension tube to be knitted, which will ordinarily be the thumb tube in the case of side thumb gloves or an end finger, i.e. either the little or index finger, in the case of inset thumb gloves. At this point, each needle of each pair of double needles carries at least a halfstitch thereon. In the first course of the first extension tube, the single needles peculiar to this tube are knitted together with one needle of each pair of double needles at the crotch point of the first tube, which one needle is preferably the closest of the pair to the first tube, the remaining needle of each pair at this crotch point, i.e. that needle of each pair remote from the first tube, being disengaged from knitting to hold thereon a half stitch of yarn from the last course of the hand portion. Although the nearest needle of the first pair of double needles at the first point on each bed is directly adjacent the group of single needles for the first tube, the nearest needle of the second pair is separated from that group by the remote needle of the first pair. The initial characterization, hence, applies to this embodiment.

Additional courses to complete the first tube may now be added in the same way, that is, knitting along with the single needles for the first tube only that needle of each pair at the first tube crotch point which is nearest the first tube while holding the other needles of such pairs inactive, and after the completion of the first tube, the stitches of the last course thereof are cast off from the needles on which they were formed. This leaves the remaining needles of the pairs of double needles at the first tube crotch still holding stitch loops thereon so that these needles can be employed in knitting the next adjacent extension tube along with one or more, as the case may be, of the other groups of needles which also hold stitch loops. The process is then repeated at the several levels of crotch points until all the extension tubes have been completed and the stitches of the last course thereof cast off from their needles. Where the first tube to be knitted is the thumb or the little finger, the hand portion tube will usually be extended before the next digit tube is begun, which hand tube extension becomes the next adjacent tubular extension within the meaning of the preceding description, and during the formation of the hand extension the double needles are knit as units as before. Obviously, the last course of the hand extensions will not be cast off from the needles, as this would remove the uncompleted glove from the machine, but are retained on the needles for use in forming the next digit tube; as each digit tube is completed, however, the stitches of the last course thereof are cast off.

(4) *Preferred variation of preferred embodiment.*—As a more preferred variation of the aforegoing method, in at least the last two courses of the hand portion, or the extensions thereon, just preceding the first course of each digit extension tube the needles of the pairs of double needles at the crotch point of such tube may be alternatively knitted separately. That is, in the next to the last course, before the level of a crotch point or point of the hand portion being knitted, one needle of each pair located at the crotch point or points at this level preferably the needle nearest the first tube to be constructed, is knitted alone with the groups of single needles then in use, the other needle of each of such pairs being held inactive, and then in the last course before this level the other needle of each pair of double needles is knitted by itself with the groups of single needles then in use. In this way, distinct separate full stitches are formed on each needle of the pairs of double needles prior to the start of the first extension tube at this level, this technique having been found to result in a tighter, more attractive fabric in the region of the crotches. The steps of the original embodiment of the method are then put into effect to knit the tube. Since the levels of the bases of the respective tubes, particularly in the case of the thumb where a side thumb glove is being knitted, will usually be at different levels transversely of the glove, the technique of manipulating the double needles alternatively in courses preparatory to the addition of a tube is repeated with the double needles at crotch points at higher levels when those levels are reached, especially where a considerable distance separates the different levels. If the crotch points of several tubes have a common level, the double needles at all of the crotch points thereof may be alternated together. In addition, if the distance separating the different levels is relatively slight, as in the case of the levels of the little finger point and the other finger points, all of the double needles of the pairs at such levels may be alternated in the same two courses preparatory to the first such level to thereby eliminate repeating the procedure at the next level. Finally, the technique of this variation can be used in more than two preparatory courses, if desired.

(5) *Alternative embodiment.*—Instead of knitting all of the pairs of double needles as single needles or units during the formation of the hand portion of the glove as was true in the preferred embodiment, the beds of needles can be set up initially to knit only one of the needles of each pair at each crotch point along with the groups of single needles, the other needle of each pair being held inactive and entirely free of yarn as the hand portion is produced. Preferably, the needle selected for active knitting is that needle of each pair which is closest that tube of each two adjacent tubes which will be knitted first in accordance with the chosen sequence. For example, in the case of the pairs of double needles between the little and ring fingers and assuming the little finger tube will be knitted first, that needle of each of such pairs which is nearest the little finger will be set up to knit and the other needles set up to be inactive. The pairs of double needles at the other crotch points will be set up accordingly. Knitting is then initiated and at least just prior to reaching each of the crotch point levels, each pair of double needles at the crotch point thereof is knitted as a unit, i.e. as a single needle, so as to place yarn in the hooks of the previously inactive as well as the previously active needles. In the case of the previously inactive needles, the yarn thereon will be in the nature of half stitches, there being no previous loops of yarn on these needles, and the yarn on the previously knitted needles will be in the nature of full stitches. The first tube at the level can then be knitted on the previously active needles of the pairs of double needles along with the groups of single needles of that tube, and the previously inactive needles, now with half stitches thereon, used for the production of the next adjacent tube. As further levels of the crotch points of subsequent tubes are reached, the pairs of double needles at these crotch points are knit as units in the same way and the procedure repeated.

Usually, the unitary manipulation of each pair of double needles at a given level is carried out in the last course of the hand portion, or extension thereof, before that level, although this can be done in more than one course if desired. Here again, the pairs of double needles used at a given level may be manipulated together as may pairs at different levels which are fairly closely spaced together.

It has been found that about the same result as with unitary manipulation of the pairs of double needles can be obtained if in a course preparatory to knitting the first extension tube at a given crotch level, such as the last course of the hand portion or an extension thereof, the previously inactive needle of each pair of double needles at the given crotch point are activated and knit along with the appropriate groups of single needles, the previously active needle of each pair being deactivated for this course. This places at least a half stitch on each of the previously inactive needles of the pairs. Once this is accomplished, the courses of the first tube at the level can be added by knitting the previously active needles of the pairs of double needles at the crotch point for the first tube along with the appropriate groups of single needles, the originally inactive needles at this crotch point being again deactivated.

Reference has already been made to the fact that the double needle of each pair which is actively engaged in knitting the courses of the hand portion is that double needle closest the first digit tube to be knitted at a given crotch point, especially if two or more pairs of double needles are present at the crotch points. While this is true, the other needle of each pair could be engaged alone during the hand portion courses, except in those courses when a stitch is placed on the inactive needles. Even so, it is still desirable in knitting the tubes at a crotch point level to knit with the corresponding groups of single needles the needle of each pair closest thereto in order that adjacent tubes shall overlap and the order of knitting the double needles is best selected with this result in mind.

(6) *Variation of alternative embodiment.*—A variation of the alternative embodiment is also possible, according to which full stitches are placed on previously inactive needles preparatory to the addition of the initial courses of each digit tube. This may be accomplished by knitting each pair of double needles at a given crotch point level as a unit in the next to last course of the hand portion, or extension thereof, and then knitting the previously inactive needle of each such pair alone in the last course before the previously active needle thereof is knitted by itself in subsequent courses to complete the tube. In this way, a full stitch is placed on each of the previously inactive needles, which stitches are available for the knitting of the next adjacent tube. Where the inactive double needle of each pair at a crotch point level is manipulated independently of the previously active needle of each pair in preparation to beginning the first tube at a crotch point instead of as a unit with the mating previously active double needle, distinct separate full stitches may be obtained on each of the previously inactive double needles by manipulating them independently in two preliminary courses rather than one, preferably with an intervening course in which the mating previously active needle is manipulated independently. In general, the appearance of the final glove is slightly better when full stitches are placed on all the double needles preparatory to beginning a digit tube. The factors governing the selection of which double needle is to be inactive at a given time and which is to be active are essentially the same as in the alternative embodiment.

(7) *Possible minor variations in all methods.*—In the discussion up to this point, it will have been noted that preferably the needle closest a tube of each pair of double needles at a given crotch point is employed along with the groups of single needles for that tube for the knitting of all of the courses in which these needles are knitted apart from their mates. This is true where there are more than one pair of double needles at the crotch point and has been found to give a smoother, more troublefree path to the yarn. The reverse arrangement could be utilized but with increased likelihood of the yarn becoming fouled. However, if only one pair of double needles is provided at a crotch point, use of the reverse arrangement becomes the more advantageous, as otherwise only a minimum increase in the tube dimension results due to the absence of an overlap between the needles, including one needle of the double needle pair, knitted to form one tube and the needles, including the other needle of the double needle pair, knitted to form the next adjacent tube.

The order of knitting of the digit tubes has not been mentioned in the discussion up to this point, at least specifically, but it will have been inferred that the order is dictated by and large by the order in which the levels of the thumb and fingers occur on the human hand. Thus, the thumb is knitted first where the thumb is formed integrally with the glove (i.e. for side thumb gloves), the little finger next (after extension of the hand portion), the ring finger next usually after further extension of the remainder of the hand portion), the middle finger next, and the index finger last. In those instances of some or all of the digit tubes to be knitted having the same crotch point level, i.e. where the thumb has the same crotch level as the fingers, or the thumb is omitted or already completed and all the remaining fingers share a common level, considerable variation in the order of forming these tubes is possible. One will normally start with a digit tube at one end or the other of the portion of the hand tube then present; once the selected tube is completed, however, the remaining tubes may be knit in whatever order may be most convenient under the particular circumstances. It is, thus, possible to start with the little finger, for example, skip to the middle finger, go back to the ring finger, etc. Obviously, a fresh choice is possible each time the hand tube is extended before the next finger tube is added. Here, since the hand extension completes the crotch to which it is adjacent and constitutes, in effect, a new tube to be subdivided, one may start at either end thereof for the next finger. For example, after completion of the little finger and extension of hand, one may then knit either the ring finger or the index finger (unless the crotches between the ring and middle fingers and between the middle and index fingers are to be at different levels, in which event the finger with the lowest crotch level must be knitted first). As each digit tube extension is completed, the stitches of the last course thereof are cast from the needles on which they are held in order to clear the field for the knitting of the needles for the next tube.

Where, in the preceding discussion and that to follow, the phrases "level of crotch point" and "level of the base of the finger" (or equivalent language) appear, it is intended that they have the same meaning. This follows from the fact that, in the strict sense, the base of the finger begins only at the level of the highest crotch on either side of that finger, so that the level of that (highest) crotch point is actually the level of the base of the finger. Confusion on this point is likely to result principally in the case of the ring finger which ordinarily has different levels for the crotches on the sides thereof. In strict truth, however, here the crotch on the little finger side of the ring finger is actually the crotch point of the little finger, i.e. between the little finger and the hand tube extension, not of the ring finger. Where the hand portion tube is not extended between the formation of digit tubes, the crotch point between two digit tubes may serve for either tube, dependent upon the order in which the tubes are knitted.

B. *Detailed Description With Reference to Drawings*

(1) *Explanation of FIG. 1.*—It is virtually impossible to illustrate in two dimensions the development of the fabric in accordance with the method of the invention. For this reason, a simplified approach to the drawings pertaining to the method has necessarily been adopted. In FIG. 1, therefore, there is shown the hook ends of two rows of needles, much as they would appear in a plan view of a Lamb type knitting machine with other components omitted. Five groups of single needles are present, designated by the letters "L," "R," "M," "I," and "T" for "little," "ring," "middle," "index" and "thumb," respectively, followed by a cardinal number to indicate the number of the needle in the group. The cardinals are used with plain designations to apply to needles in the "front" row and with prime designations to apply to needles in the "back" row, corresponding needles in the two rows otherwise having the same designation. Between each two groups so designated are pairs of double needles as indicated by small brackets embracing two needles at both the top and bottom of the rows, there being two such pairs of double needles shown in FIG. 1 on each row between each two adjacent groups of single needles. The double needles are designated X with a subordinate letter and cardinal similar to the letters and cardinals of the single needles, which subordinate characters indicate the group of single needles with which the double needles are preferably associated during the formation of digit tubes in accordance with the steps of the preferred method embodiment. For example, needles $X_{L8}$ and $X_{R1}$ constitute one pair of double needles which are knitted as a unit at certain times. When knitted separately during the formation of the finger tubes, needle $X_{L8}$ functions with the little finger group (hence the "L") and is the eighth needle of that group while needle $X_{R1}$ functions with the ring finger (hence the "R") and is the first needle of that group. The order of the numbers is illustrative only and would be varied if the sequence of forming the digit tubes were changed. Also, the same order has been used for both rows despite the fact that knitting proceeds in opposite directions therein.

To facilitate an understanding of the groupings of needles, dot-dash lines have been placed at the end needle and at the beginning needle for each digit group and brackets extend between these lines at the bottom of the figure with an appropriate legend identifying the digit to which the group belongs. Also at the bottom, the dot-dash lines which coincide with the "crotch points," as the term is used herein, have been extended and labeled. In addition to the digit groups, it will be recalled that after the completion of the thumb, all of the finger groups may be, and preferably are, knitted together to extend the hand tube and, similarly, after the completion of the little finger, the needles of the ring, middle, and index groups may, and preferably will, be knitted together to further extend the remainder of the hand tube. Brackets embracing the needles active in forming these extensions appear at the top of one figure with appropriate legends. Arrows establishing the direction in which the two rows of needles are assumed to be knitted for purposes of illustration have been placed at the left ends of the rows.

(2) *Preferred embodiment of method.*—For the description of the preferred embodiment of the method with reference to FIG. 1, it is assumed that a glove having a tubular extension for the thumb and each of the four digits is to be knitted and that the needles in the front row are to be knitted from left to right and the needles in the back row to be knitted from right to left, each course of yarn is to be knitted beginning and ending at the left side of FIG. 1. In accordance with the preferred embodiment, all of the pairs of double needles which are encompassed within the limits of each course knitted during the formation of the hand portions of the glove are to be manipulated as single needles so that each pair of the double needles which is involved in knitting any given course draw a single common stitch. It will be seen from FIG. 4, a diagrammatic view of a completed glove, that the courses which are formed during the construction of the wrist portion 10 of the glove may be, and ordinarily are, of a lesser transverse dimension than the courses in the body of the hand portion. In other words, in forming the wrist portion 10, all of the needles set up for knitting the glove will not ordinarily be employed, some of the needles at one or both ends of the two rows being omitted. In any event, all of the pairs of double needles within the limits of the courses of the wrist portion are knit as single needles as those courses are added. The precise manner in which the wrist portion is formed is of no particular consequence to the present invention, which is to say that the wrist portion is formed by conventional procedures except as regards the manipulation of the pairs of double needles. After the completion of the wrist portion, the section of the hand 11a adjacent the wrist portion is constructed up to the transverse level of the crotch point at the base of the thumb. During such construction, the pairs of double needles are continued to be manipulated as single needles to draw on each pair of single common stitches, and except for this practice, the manner of constructing the lower portion 11a of the hand may be conventional. For example, the procedure disclosed in the previously mentioned Powell patent may be followed, during which the thumb side, and preferably the opposite or little finger side as well may be widened as indicated at 12 and 13, respectively, by means of a fashioning technique by which the needles at the ends of the rows omitted during the formation of wrist portion 10 are added one by one. In the event pairs of double needles are included within the needles to be added, each of such pairs is knitted as a single needle as it is introduced into the knitting operation. It is now assumed that the lower hand portion 11a is complete up to the level of the crotch point at the base of the thumb. Each of the pairs of double needles having been knit as single needles up to this point, all of such pairs will carry half-stitches of yarn thereon.

The first course of the thumb is now added by knitting the groups of single needles corresponding to the fingers and the pairs of double needles between such groups on the front row in the order that they appear up to the crotch point of the thumb. That is, little finger group L1–L7, pairs of double needles $X_{L8}$, $X_{R1}$ and $X_{L9}$, $X_{R2}$, and ring finger group R3–R7, pairs of double needles $X_{R8}$, $X_{M1}$, and $X_{R9}$, $X_{M2}$, and so on are knit up to the pairs of double needles $X_{I8}$, $X_{T1}$ and $X_{I9}$, $X_{T2}$. As these pairs of needles are encountered, instead of being knit as units, only one needle of each pair is allowed to engage in knitting, the other needle of each pair being disengaged from knitting to hold thereon at least the half stitch formed as the hand portion was constructed. Preferably, each needle of the pairs of double needles which are nearest the thumb group of needles T3–T9 on the front bed, namely needles $X_{T1}$ and $X_{T2}$ constitute the needles allowed to take place in knitting. After one needle of each of the pairs of double needles at the thumb crotch on the front bed are knit, knitting is continued on the thumb group of single needles T3–T9 in the front row, and then on the corresponding group, T'9–T'3 (the direction of knitting now being from right to left) up to the pairs of double needles existing in the back row at the thumb crotch point. These pairs of double needles are manipulated in the same manner as the corresponding pairs on the front bed, only one needle of each pair being engaged in knitting, which needle is preferably $X'_{T2}$ of the first pair and $X'_{T1}$ of the second pair, the nearest needle of each pair to the thumb group on the same bed. The remaining needles of these pairs, preferably $X'_{I9}$ and $X'_{I8}$ are disengaged from the knitting operation. Additional courses of yarn in sufficient number to complete the thumb are now added, again allowing to be actively engaged in knitting the needles of the thumb groups and that needle of each pair of double needles at the thumb crotch point which was actively knit during the preceding course, namely, needles $X_{T1}$ and $X_{T2}$ in the front row and $X'_{T2}$ and $X'_{T1}$ on the back row according to the previously expressed preference. When the thumb has been completed, the stitches of the last course thereof are cast off from those needles on which they were formed and such needles are thereafter disengaged entirely from the knitting operation and play no further role in the construction of the glove.

In order to reach the thumb during the addition of the first course thereof, it was necessary to knit on the needles of the single groups and associated pairs of double needles in the front row and it now becomes necessary to do the same thing on the corresponding needles of the back row to again achieve the left end of the row in preparation for the next course. To do this, the knitting of the yarn coming from the end of the thumb is picked up on the index finger group of single needles, I'7–I'3, continued on the pairs of double needles between the index and middle finger groups, $X'_{I2}$, $X'_{M9}$ and $X'_{I1}$, $X'_{M8}$ and so on until the left end of the back row is reached, all of the pairs of double needles in the back row between the single groups being knit as single needles.

Referring back to FIG. 4, it will be seen that a considerable distance separates the transverse level of the thumb crotch from the transverse level of the little finger crotch so that an extension 11b must be provided on the lower hand portion 11a. This extension is formed by knitting courses on the finger groups of single needles and the pairs of double needles in each row plus the needle of each pair of double needles at the thumb crotch point which was disengaged during the formation of thumb tube 14. In other words, the courses of the hand portion extension 11b are added by knitting all of the needles remaining after the completion of the thumb and this includes, according to the indicated preference, needles $X_{I8}$, $X_{I9}$, $X'_{I9}$ and $X'_{I8}$ as well as the groups of single needles corresponding to the fingers and the pairs of double needles between such groups. During the formation of the courses of the hand portion extension, the pairs of double needles between the finger groups are continued to be actuated as single needles.

The little finger is now constructed in essentially the same fashion as the thumb except that the position of the little finger at the left end of the rows make it unnecessary to cross intervening groups of needles as was the case with the thumb. Thus, the first course of the little finger is started on needles L1–L7 on the front row, continued on only one needle of each of the pairs of double needles at the little finger crotch point in the front row, picked up on one needle of each of the pairs of double needles in the back row at the little finger crotch point and concluded on the back row group of single needles L'7—L'8. Again, it is preferred that the actively knitted needle of each pair of double needles at the little finger crotch point is that needle of each pair which is nearest the needles of the little finger group on the same bed, namely, $X_{L8}$, $X_{L9}$, $X'_{L9}$ and $X'_{L8}$. The remaining needles of the pairs of double needles at the little finger crotch point, i.e., preferably that needle of each pair which is remote from the little finger group but nearest the ring finger group, is withdrawn from the knitting operation. Additional courses to complete the little finger are added in the same manner and using the same needles as the first course thereof and after completion of the little finger, the stitches of the last course thereof are cast off from these needles, which needles are from this point on disengaged from the knitting operation and play no further role.

If the glove being knitted is to be of the form-fitting type, a further extension 11c on the hand portion is necessary in view of the difference in the transverse levels of the little finger crotch and the crotches of the remaining fingers on the normal human hand (see FIG. 4). The procedure for forming the courses necessary for this extension is essentially the same as that for forming the courses of the hand portion extension 11b except for the removal from the knitting operation of the needles used in forming the little finger, namely needles L1–L7, L'1–L'7 and one needle of each pair of the double needles at the little finger crotch point, preferably needles $X_{L8}$, $X_{L9}$, $X'_{L8}$ and $X'_{L9}$. Thus, in the courses of further extension 11c are the single needles of the ring, middle and index fingers, the pairs of double needles therebetween plus two of the double needles at each end of each row, preferably $X_{R1}$, $X_{R2}$, $X'_{R1}$ and $X'_{R2}$ at the left end and $X_{I8}$, $X_{I9}$, $X'_{I8}$ and $X'_{I9}$ at the right end. In the courses of the further extension the pairs of double needles on each bed at the crotch points between the ring and middle fingers and between the middle and index fingers are still knit as units.

After the completion of the further hand portion extension, the next finger extension is added which may be at either end of the fingers remaining to be knitted. In other words, each time the hand portion is extended one may choose for the digit tube next to be knitted, any finger at an end of the tube portion just extended. Accordingly, at the present point of the development of the glove one may choose either the ring finger or the index finger as the finger extension next to be knitted. There are no strong reasons for preferring either of such fingers over the other although it appears more orderly to knit that extension which is next adjacent the extension just completed, in this case the ring finger. The first course and all subsequent courses of the ring finger are knit utilizing the remaining yarn carrying needles of the double needles at the little finger crotch, i.e. preferably needles $X_{R1}$, $X_{R2}$, $X'_{R1}$ and $X'_{R2}$, the needles R3–R7 and R'3–R'7 of the ring finger groups plus one needle of each of the pairs of needles at the ring finger crotch point which is again preferably that needle of each pair closest to the needles of the extension being formed or needles $X_{R8}$, $X_{R9}$, $X'_{R8}$ and $X'_{R9}$. The remaining needles at the ring finger crotch point, i.e. needles $X_{M1}$, $X_{M2}$, $X'_{M1}$ and $X'_{M2}$ and disengaged from knitting during the formation of the ring finger. After the completion of the ring finger the stitches of the last course thereof are cast off from the needles actively utilized in its formation which needles thereafter are eliminated from knitting.

Ordinarily, the crotch point between the mdidle and index fingers is at the same transverse level as the crotch point between the ring and middle fingers so that further extension of the hand portion is unnecessary. This being so, the middle finger is constructed in a manner identical to the ring finger after which the index finger is added and it is believed unnecessary to repeat in detail the procedure involved. In the event a further extension of the hand portion preparatory to adding the middle finger is desired, the procedure by which this may be accomplished is essentially the same as that involved in forming extension 11c. Should the index finger be knitted first rather than the ring finger after the addition of the further extension 11c, then the order of the addition of fingers is reversed, but the principles of the method will remain the same, the crotch point between the index and middle fingers now becoming the index finger crotch point and the crotch point between the ring and middle fingers now becoming the middle finger crotch point. It is for this reason that the alternative is indicated in the legends for these crotch points in the drawings (R/M, I/M).

Upon the completion of the last finger and the casting off of the stitches of the last course thereof, the glove is removed from the machine. At this stage, the ends of the digit tubes are open and the end of each such tube except the last is connected by a short length of yarn to the next tubular extension that was knitted. These ends of yarn must be clipped, knotted into the base of the next tubular extension, and the ends of the digit tubes closed by techniques known in the art. Additional finishing and/or decorating procedures may be applied to the glove if desired.

In the preceding description, it has been assumed that two pairs of double needles are present at each of the crotch points in the glove to be knitted. In the event only one pair of needles is present at each such crotch point, it is preferred that the one needle of each such pair which is allowed to take part in the construction of each digit tube is that needle which is remote from the tube being knitted. This is necessary in order to provide on each bed an inactive needle between the group of single needles and at least one of the double needles being actively knitted with that group. Where only one pair of double needles is present on each bed, at each crotch point, this preferred condition can be satisfied only by knitting with the particular group of single needles, the needle of each pair remote from that group while holding the needle of each pair adjacent that group inactive. In contrast, where two pairs of needles are present on each bed at each crotch point as in the previous discussion, knitting of the needle of each pair nearest the particular single groups of needles will nevertheless cause the nearest needle of the second pair to be separated from the single needle group by the remote needle of the first pair. If three or more pairs of double needles were to be provided at each crotch point on each bed, it would still be most advantageous to knit with a particular group of single needles during the construction of the corresponding digit tube, that needle of each pair nearest the single needle group and, in this case, there would be two or more active needles at each crotch point on each bed which would be separated from the group of single needles being actively knitted by inactive needles. Obviously, the manipulation of the needles and the path followed by the yarn incidental thereto becomes increasingly more complicated as the number of pairs of double needles at each crotch point on each bed is multiplied and, for this reason, the use of only two pairs at each point on each bed is both preferred and recommended.

While the best mode of practicing the preferred method embodiment calls for the use during the formation of the first tubular extension at a given crotch point of the groups of single needles corresponding to that extension along with that needle of the pairs of double needles on each bed at the given crotch point which is closest the corresponding group of single needles on the same bed, this is not absolutely essential and it is instead possible to use on each bed the group of single needles for the extension along with that needle of each pair at the given crotch point which is remote from the group of single needles. Thus, for example, it is possible to construct the thumb using double needles $X_{I8}$ and $X_{I9}$ with single needles T3–T9 in the front row and double needles $X'_{I8}$ and $X'_{I9}$ with single needles T'3–T'9 in the rear row. However, the use of the remote double needle of each pair where two or more pairs are present at a given crotch point has been found in practice to increase the chances of the yarn becoming fouled with the intervening inactive double needles. Similarly, where only one pair of double needles is present at a given crotch point, preferred usage calls for the activation along with the appropriate group on each bed for the the first extension to be formed at such point of the double needle of that pair which is remote from the group of single needles, as already explained, but it is nevertheless possible to activate instead the inner or closest needle of that pair along with the appropriate group of single needles on each bed. Thus, for example, assuming that only one pair of double needles is present at the thumb crotch point ($X_{I8}$ and $X_{T1}$ in the front row and $X'_{I8}$ and $X'_{T1}$ in the back row), $X_{T1}$ and $X'_{T1}$ may be knit with the groups of single needles for the thumb during the formation of the thumb, double needles $X_{I8}$ and $X'_{I8}$ being held inactive. Necessarily, this means that although an additional wale will be introduced into each side of each digit tube, there will be no overlap between each digit tube and the adjacent digit tube or hand portion tube and, for this reason, it is considered an imperfect use of the principles of the invention.

(3) *Variation of preferred embodiment.*—In accordance with the variation of the preferred embodiment, distinct and separate full stitches are placed upon each needle of the pairs of double needles before these needles are employed in the construction of tubular extensions, this variation being deemed more desirable in active practice than the preferred embodiment as originally described. To accomplish the variation, in the late courses of the hand portion or extensions thereof, that is the several courses of the hand portion and extensions just prior to each crotch point level, the needles of the pairs of double needles are actuated independently with the groups of single needles being knitted at the particular time, the non-actuated needle of each pair being held disengaged from knitting. For example, assuming that hand portion 11a is being knitted as in the preferred embodiment, the pairs of double needles being actuated as single needles, in the next to the last course of hand portion 11a before achieving the level of the thumb crotch point, one needle of each pair of double needles at the thumb crotch point is actuated alone or independently of the other needle of each pair at that point, which other needle is disengaged from knitting during this course and then in the last course of hand portion 11a, the said other needle of each pair is actuated along with the appropriate groups of single needles while the first needle of each pair is held inactive.

Preferably, the needle of each pair actuated in the next to last course of the hand portion is that needle nearest the group of single needles on each bed corresponding to the first tube to be formed at the particular crotch point, the double needle of each pair in each bed remote from that group of single needles being held inactive during that course. Then, in the last course, the remote needle of each pair of each bed is activated while the near needle is inactivated. The reverse arrangement could be utilized if desired, but, since it is desired to employ the near needle of each pair during the formation of the first tube at a crotch point, the order in which the double needles are manipulated independently is best selected to have the near needle of each pair inactive in the last course of the hand portion so that its activation in the first course of the first extension tube will follow in logical sequence.

Applying these considerations specifically to FIG. 1 and assuming that two pairs of double needles are present on each bed at each crotch point as in that figure, in the next to the last course of hand portion 11a, the double needles at the thumb crotch point instead of being knit as units as in previous courses, are knit independently and preferably in the next to the last course double needles $X_{T1}$ and $X_{T2}$, $X'_{T1}$ and $X'_{T2}$ are caused to engage in knitting alone, the mating double needles $X_{I8}$, $X_{I9}$, $X'_{I8}$ and $X'_{I9}$ being disengaged in this course. In the next or final course of the hand portion, those needles which were disengaged in the previous course, preferably needles $X_{I8}$, $X_{I9}$, $X'_{I8}$ and $X'_{I9}$ are caused to be engaged in knitting while needles $X_{T1}$, $X_{T2}$, $X'_{T1}$ and $X'_{T2}$ are disengaged. It will be understood, of course, that the pairs of double needles present at the other crotch points are still knitted as single needles throughout these courses. At this stage, the double needles of each pair at the thumb crotch point will carry distinct independent stitches and are ready for the addition of the first course of the first extension tube at that point and the first course of the thumb can now be formed by knitting on double needles $X_{T1}$, $X_{T2}$, $X'_{T1}$ and $X'_{T2}$ which are actively engaged in knitting along with single needles T3–T9 and T'3–T'9. Additional courses on the thumb are formed in the same way on the same needles.

This sequence of needle manipulation is carried out at at least each crotch point level which is spaced a substantial distance from the preceding crotch point level. Thus, it is carried out in connection with the pairs of double needles at the little finger crotch point as this crotch point is spaced a considerable distance from the thumb crotch point level. Since the level of the crotch points for the ring, middle and index fingers is spaced only a short distance from the level of the little finger crotch point, the pairs of double needles at the crotch points between the ring and middle and middle and index fingers may be manipulated independently at the same time and in the same courses as the pairs of double needles at the little finger crotch point or they may be manipulated separately in the last and next to last courses of the further hand tube extension 11c. In other words, one may alternate the needles of all of the pairs of double needles at the finger crotch points simultaneously in the late courses of hand portion 11b or else one may alternate the needles of the pairs at the little finger crotch points only in these courses and then alternate the needles of the remaining crotch points in the late courses of the further hand portion extension 11c. It does not appear that there are any major reasons for preferring either of these sequences over the other except that the former eliminates the need for repeating the operation and is consequently a step in the direction of simplification.

While it is not necessary to alternate the needles of the double needle pairs in more than two courses prior to the addition of the first course of the first extension tube to be knitted at a given crotch point level in order to provide distinct separate full stitches on each double needle, it is possible to do so in more than two preparatory courses if desired. Accordingly, the needles of the double needle pairs could be alternated in four preparatory courses instead of two.

(4) *Alternative embodiment.*—The alternative embodiment differs principally from the preferred embodiment in that only one needle of each pair of double needles is engaged in active knitting during the formation of the hand portion and/or extensions thereof in which the pair of double needles is involved and preparatory to beginning the first extension tube to be knitted at a given crotch point level, steps are taken to place at least half stitches on the previously inactive double needles. The needle of each pair which is preferably knitted during the hand portion is the needle closest to the group of single needles on the same bed corresponding to the first extension tube to be knitted at the crotch point at which the particular pair of double needles is situated. Thus, in the case of the pairs at the thumb crotch point during the hand portion courses, needles $X_{T1}$, $X_{T2}$, $X'_{T1}$ and $X'_{T2}$ are actively engaged in knitting, the mating needles of these pairs, i.e., needles $X_{I8}$, $X_{I9}$, $X'_{I8}$ and $X'_{I9}$ being disengaged from knitting. Similarly, in these courses with respect to the pairs at the little finger crotch point, double needles $X_{L8}$, $X_{L9}$, $X'_{L8}$ and $X'_{L9}$ serve as active needles while needles $X_{R1}$, $X_{R2}$, $X'_{R1}$ and $X'_{R2}$ remain inactive. It will be seen as a consequence of the aforegoing, one needle of each pair of double needles will be provided with a distinct full stitch while the other needle thereof will be entirely free of yarn and these latter needles must be provided with at least half stitches before the beginning of the first extension tube to be knitted at the particular crotch point. This is done by knitting the pairs of double needles at a given crotch point level as units in one of the late courses of the hand portion and/or extension thereof prior to that level. For example, in the case of the double needles at the thumb crotch point, each pair thereof is knit as a unit in at least the last course of hand portion 11a before the level of the thumb crotch point and, similarly, the pairs of double needles at the little finger crotch point are knit as units in at least the last course of hand portion 11b prior to the little finger crotch point. It is optional whether the pairs of double needles at the ring/middle finger crotch point and the index/middle finger crotch point are knit as units in the same course with the pairs at the little finger crotch point or whether they are knit as units in at least the last course of the further hand tube extension 11c. By knitting each pair as a unit in at least one such course, at least a half stitch is placed on that needle of each pair maintained inactive in previous courses of the hand while a further full stitch is placed on that needle which was actively engaged in the knitting of prior courses. While it is only necessary to knit each pair as a unit in a single course, this can be done in more than one course if desired. Having placed at least an independent half stitch on each needle of the double needle pairs at a given crotch point level, one may then proceed to knit the first course of the first extension tube to be constructed at the particular crotch point. The sequence for the construction of that tube is the same as before, namely, the nearest needle of each pair at a point is knit along with the single group of needles on the same bed corresponding to the first tube in accordance with the previously indicated preference. As each digit tube is completed, the next adjacent hand portion extension tube or digit tube is added, and the process repeated in connection with the further crotch point levels.

Instead of knitting the pairs of double needles at the respective crotch point levels as units in a late, i.e. the last, course of the hand portion tube or extension thereof as just described, it has been found that essentially the same result can be obtained if the previously inactive needle of each pair at the particular level is merely knit independently of the previously active needle of each such pair as the course is being added, the previously active needle of each such pair being maintained inactive during this course. In other words, at least a half stitch can be placed on each previously inactive double needle at a crotch point level during the addition of a late course in the hand portion or hand portion extension, as the case may be, just before reaching that level by knitting the previously inactive needles as units with their mating previously active needles or by knitting the previously inactive needles independently of the previously active needles. In either event, the groups of single needles and the double needles at other crotch point levels will be knit as before during such courses. For instance, with reference to FIG. 1 in the last course of hand portion 11a leading up to the level of the thumb crotch point, previously inactive needles $X_{I8}$, $X_{I9}$, $X'_{I8}$ and $X'_{I9}$ may be knit exclusively of the mating previously active double needles at this crotch point, i.e. needles $X_{T1}$, $X_{T2}$, $X'_{T1}$ and $X'_{T2}$, the latter being maintained inactive during this course. Courses to form the thumb may then be constructed using the groups of single needles for the thumb along with double needles $X_{T1}$, $X_{T2}$, $X'_{T1}$ and $X'_{T2}$ during which double nedeles $X_{I8}$, $X_{I9}$, $X'_{I8}$ and $X'_{I9}$ will remain inactive. The hand portion extension 11b is then formed by knitting courses on the finger groups of single needles, one needle of each double needle pair located at the crotch points between the fingers plus double needles $X_{I8}$, $X_{I9}$, $X'_{I8}$ and $X'_{I9}$ at the thumb crotch point. In the last course of hand tube extension 11b, the previously inactive double needles at the little finger crotch, i.e. needles $X_{R1}$, $X_{R2}$, $X'_{R1}$ and $X'_{R2}$ are knit exclusively of their mating previously active needles to thereby provide half stitches on these needles. The little finger tube is then added utilizing the little finger groups of single needles along with double needles $X_{L8}$, $X_{L9}$, $X'_{L8}$ and $X'_{L9}$. The hand portion is then preferably extended further as at 11c in essentially the same way as in the case of extension 11b and the remaining single tubes added. The manner in which the remaining fingers are formed will be obvious from what has been said in connection with the formation of the thumb and little fingers.

(5) *Variation of alternative embodiment.*—There exists for the alternative embodiment a variation which is identical in principle to the variation of the preferred embodiment, its purpose being to provide distinct separate stitches on each of the needles of the double needle pairs at a given crotch point level preparatory to beginning the first extension tube to be knitted at that level. In accordance with this variation, the previously inactive needles of the double needle pairs at the level after being knit as units in a preparatory course are knit independently in a subsequent course before beginning a digit tube. Thus, using the double needles at the thumb crotch point for an example, the pairs thereof are knit as units in the next to the last course of hand portion 11a rather than in the last course as was true for the alternative embodiment, and in the last course of portion 11a before beginning the thum tube, the previously inactive needles, preferably double needles $X_{I8}$, $X_{I9}$, $X'_{I8}$ and $X'_{I9}$, are knit exclusively of the mating double needles, $X_{T1}$, $X_{T2}$, $X'_{T1}$ and $X'_{T2}$, the latter needles being held inactive in this course. In other words, the objectives of the variation are achieved by knitting in successive courses the previously inactive needles first as units along with the previously active needles to place a half stitch thereon and then independently of the previously active double needles to place full stitches thereon. This process is repeated at each of the crotch point levels except that in the case of the last level, viz. that of the ring/middle crotch point and index/middle crotch point, the pairs of double needles thereat may be optionally manipulated along with the pairs of double needles at the little finger crotch point in the next to last and last courses of hand portion extension 11b.

In case each previously inactive double needle at a given crotch point level is merely knit independently of its mating previously active double needle preparatory to the addition of the first extension tube to be knitted at a crotch point level instead of being knit as a unit with its mating needle, a distinct separate full stitch may be placed thereon by again knitting each such originally inactive double needle in a subsequent course but still preparatory to beginning first extension tube. Preferably, between the two courses in which each originally inactive double needle is knit independently there is a course in which the originally active needles of the double needle pairs at the crotch point level are themselves knit independently of the mating originally inactive double needle. Explaining this sequence with reference to FIG. 1 and assuming that double needles $X_{T1}$, $X_{T2}$, $X'_{T1}$ and $X'_{T2}$ are the originally active double needles at the thumb crotch point, in the third course of hand portion 11a prior to the level of the crotch point, these originally active needles are deactivated and the originally inactive needles at this crotch point, i.e. needles $X_{I8}$, $X_{I9}$, $X'_{I8}$ and $X'_{I9}$ are caused to become active along with the other needles necessary for this course. Then, in the next to last course, needles $X_{T1}$, $X_{T2}$, $X'_{T1}$ and $X'_{T2}$ are reactivated, the knitting needles $X_{I8}$, $X_{I9}$, $X'_{I8}$ and $X'_{I9}$ being again deactivated. Finally, in the last course of hand portion 11a, needles $X_{I8}$, $X_{I9}$, $X'_{I8}$ and $X'_{I9}$ are activated once more while their mates are deactivated. At this point, full stitches will be provided on each of the originally inactive double needles at the thumb crotch point as well as the originally active needles there and needles $X_{T1}$, $X_{T2}$, $X'_{T1}$ and $X'_{T2}$ are ready to be used in the formation of the thumb tube, which use is a continuation of the sequence in which the double needles are independently manipulated. While the order in which the respective double needles of each pair are independently manipulated can be varied, it is preferred that they alternate in successive courses and that the needle of each pair thereof manipulated in the last course before beginning a digit tube be that needle which is to be maintained inactive during the knitting of the first course of that tube.

C. *Three-Dimensional Illustration of Action of the Double Needles*

(1) *General explanation of FIGURES 2A–2F and 3A–3F.*—As already explained, it has been found impractical if not impossible to illustrate in a single plane the production of fabric in accordance with the invention; however, in an attempt to convey a better understanding of how the double needles are manipulated as units and independently as well as the effect of such manipulation upon the thread being knitted, there is shown in the above identified drawings sequences of knitting steps first in relation to the preferred embodiment and its variation and second, in relation to the alternative embodiment and its variation. In these figures, only a fragment of the components in a bed is shown, embracing three equispaced sinkers designated $S_1$–$S_3$, one pair of double needles designated $X_1$ and $X_2$ between one adjacent pair of such sinkers and a single needle D of the digit needle groups between the other adjacent pair of sinkers. Since similar knitting components at corresponding points on each bed take part in similar operations at corresponding times in the process, an understanding of the action of all the components should follow an understanding of the representative few shown in the drawings.

(2) *Preferred method embodiment and variation.*—Since the variation of the preferred embodiment uses the essential novel step of the preferred embodiment in its basic form and differs therefrom in the addition of extra steps in extra courses, the sequence of steps illustrated in FIGURES 2A–2F have been selected to show the more elaborate combination of steps of the variation, but the precise sequence for the basic form of the preferred embodiment will nevertheless be understood by omitting or skipping over those figures which pertain only to the variation as will be explained.

In FIG. 2A, it is assumed that knitting has been taking place in the direction indicated by the arrow in the courses of the hand portion or an extension thereof, the double needles $X_1$ and $X_2$ having been manipulated in successive courses as a unit to draw a common stitch thereon and the single needle D has been manipulated to draw a single stitch thereon, three of such courses designated $a$, $b$, and $c$, respectively, being indicated with the stitches $a_2$, $b_2$, and $c_2$ being drawn by the double needles operating as a pair and stitches $a_1$, $b_1$, and $c_1$ by the single needle. It should perhaps also be explained that the actuation of the sinkers and needles to draw stitches is assumed to follow that technique described and claimed in the Powell Patent No. 2,418,957 in accordance with which the stitches are drawn by the needles against vertical edges on corresponding adjacent pairs of sinkers extending above the sinker hooks and after the stitches are fully drawn, the sinkers are elevated and lowered again to displace the sinker contacting portions of the stitches downwardly below the sinker hooks. Thus, in FIG. 2A, courses $a$ and $b$ are shown extending below the sinker hooks with course $c$ extending above the sinker hooks, while in FIG. 2B, course $c$ is also shown below the sinker hooks. The elevation of the sinkers as would occur between various stages, for instance between FIGS. 2A and 2B, has not been shown in the sequence of figures since it is not a novel feature of the present invention. However, where a course is shown above the sinker hooks in one figure and below the hooks in the next figure, it will be understood what has been done to make this difference.

With respect to the preferred embodiment, course $c$ can be considered the last course of the hand portion or an extension thereof just before the addition of the first course of the first tubular extension to be added at the crotch point at which the pair of double needles $X_1$, $X_2$ is situated. Consequently, as can be seen from FIG. 2A, each of the double needles carries thereon the equivalent of a half stitch, no independent stitch loop having been formed on either needle. FIG. 2B shows the operative needles in projected portion to take on the next course of yarn $d$ (the first course of the first extension) and for the purpose of this figure, needle $X_1$ is considered to be the active needle of the pair and needle $X_2$ the inactive needle so that the needle $X_1$ as well as needle D are shown in projected position with the yarn of the next course $d$ engaged in the hooks thereof preparatory to being drawn into a stitch and needle $X_2$ is shown in retracted position still holding in its hook its portion of the stitch $c_2$. In FIG. 2C, needles $X_1$ and D have been retracted to draw stitches $d_2$ and $d_1$, respectively. From what has been previously said in connection with the preferred method embodiment, it will be appreciated that needle $X_1$ is preferably the nearest needle to the tube being knit of each pair of double needles at the crotch point for that tube, it being assumed, of course, that another pair of double needles is present on the side of needles $X_1$, $X_2$ opposite needle D. Where only one pair of double needles is present, needle $X_1$ is preferably inactive and needle $X_2$ active to provide some overlap. After course $d$, additional courses to complete the first tube are added on the same needles, which courses are identical to course $d$ and repetitious of FIG. 2C. Hence, FIGS. 2D–2F do not apply to the basic form of the preferred embodiment.

With respect to the preferred variation of the preferred embodiment, course $c$ in FIG. 2A is assumed to be the second from the last course of the hand portion or an extension thereof, all other factors being the same as in the case of the preferred embodiment. For course $d$, needles D and $X_1$ are projected, as in FIG. 2B, to take on the yarn of course $d$, needle $X_2$ being held inactive to retain in its hook the corresponding portion of stitch $c_2$, after which needles D and $X_1$ are retracted, as in FIG. 2C, to draw stitch $d_1$ through stitch $c_1$ and a stitch $d_2$ through the corresponding portion of stitch $c_2$. As the last course of the hand portion or extension is added, needle $X_2$, which was held inactive in the previous course, is now activated along with needle D to take on the yarn thereof, needle $X_1$ being maintained inactive to hold the stitch $d_2$ in its hook (see FIG. 2D) and needle $X_2$ then is retracted to draw the stitch $e_2$ through the portion of the stitch $c_2$ that was associated with needle $X_2$ and needle D to draw stitch $e_1$ through stitch $d_1$ (see FIG. 2E). At this stage, each of the double needles $X_1$, $X_2$ carry thereon the independent stitches $d_2$ and $e_2$ that were formed by drawing the yarn of successive courses through the common stitch $c_2$. Since stitches $d_2$ and $e_2$ are each drawn through the previous stitch $c_2$, they are considered herein as full stitches.

Distinct and separate full stitches on the double needles characteristic of the preferred variation having been provided, all is in readiness for the formation of the first course of the first extension to be knit at the crotch point and in FIG. 2F, needle $X_1$ (assumed to be nearest to the first extension) is shown in projected position to take on the yarn of the next course $f$ and subsequent courses of this tube are formed in the same way. The further steps of the sequence have been omitted as it is virtually impossible to accurately illustrate the complex convolutions of the yarn after the stage shown in FIG. 2F.

(3) *Alternative embodiment and variation.*—The arrangement of FIG. 3A is similar in all respects to that of FIG. 2A except that it is assumed that only one needle of the double needle pair has been actively knit during these courses, which one needle is preferably the needle $X_1$ as shown, the other needle $X_2$ being entirely free of stitches. Before adding the first course of the first tubular extension to be knit at the crotch point at which the pair of double needles $X_1$, $X_2$ are assumed to be situated, it is necessary in accordance with the alternative embodiment to cast a half stitch upon the previously inactive material $X_2$. This is preferably done by knitting the pair of double needles as a unit along with single needle D in at least one course preparatory to the first course of the first tubular extension. In FIG. 3B, the single needle and both double needles are shown in projected position to take on the yarn $d$ of the new course and in FIG. 3C all needles are shown in retracted position to draw stitches in the yarn of course $d$, single needle D drawing another full stitch $d_1$ through stitch $c_1$, the previously active needle $X_1$ drawing a full stitch $d_2$ through the previous stitch $c_2$ and the previously inactive needle $X_2$ drawing only a half stitch $d_3$, there being no previous stitch on that needle. Once the presence of the half stitch on the previously inactive needle is achieved, the first course of the first tubular extension at the particular crotch point is formed by knitting previously active needle $X_1$ as in courses $a$, $b$ and $c$ of FIG. 3A, the originally inactive needle $X_2$ being deactivated in all of such courses to hold the half stitch $d_3$ thereon. The action of the needles in such courses of the extension has not been illustrated in the drawings but would essentially resemble FIG. 3A except for the continuing presence of half stitch $d_3$ on needle $X_2$.

Instead of knitting the double needle pair as a unit in the last course of the hand portion, it is possible, as already explained, to merely knit the previously inactive needle exclusively of the previously active needle in that course. This possibility has not been separately illustrated since it closely resembles the conditions of FIGS. 3B and 3C, the only difference being that previously active needle $X_1$ is excluded from course $d$, the stitch $c_2$ being held in the hook thereof, while the previously inactive needle $X_2$ is knitted apart from needle $X_1$ and is the only double needle to take on the yarn and draw a stitch in course $d$. Single needle D is, of course, knitted in all courses shown as before.

In the variation of the alternative embodiment, all things are the same as in FIGS. 3A–3C, it being immaterial whether the previously inactive needle $X_2$ is knit in course $d$ as a unit with the previously active needle $X_1$ or apart therefrom, except that course $d$ constitutes the next to the last rather than the last course of the hand portion or an extension thereof. At this point, the previously active needle $X_1$, obviously, is provided with a full stitch thereon $d_2$ (or $c_2$) as is single needle D with stitch $d_1$ while needle $X_2$ has only a half stitch $d_3$ in its hook. To also provide needle $X_2$ with a distinct full stitch in accordance with the variation, in the next course (the last course of the hand portion or extension) previously inactive needle is knit apart from needle $X_1$ to take on the yarn $e$ of the last course (see FIG. 3D) and to draw the stitch $e_2$ through the half stitch $d_3$, the needle $X_1$ being maintained inactive and continuing to hold in its hook the stitch $d_2$ placed therein during the previous course $d$ (see FIG. 3E). In forming the courses of the tubular extension at the crotch point in question, the previously active needle $X_1$ is again engaged in knitting along with the single needle D of the single needle group corresponding to that extension while needle $X_2$ is deactivated. One such course $f$ is shown in FIG. 3F, needle $X_1$ having drawn stitch $f_2$ through the stitch $d_2$, the needle $X_2$ being inactive and continuing to hold the stitch $e_2$ in its hook, and the single needle D having drawn the stitch $f_1$ through the previous stitch $e_1$. If desired, a further course (not shown) similar to course $c$ may intervene between course $d$ and course $e$ to establish a pattern of alternation between originally active and inactive needles.

D. *Summary of Features Common to All Methods*

Careful reading of the descriptions of the several methods disclosed herein will have revealed the existence of features common to all of these methods. First of all, a digit tube, i.e. either a thumb or finger tube, is always the first tubular extension to be knitted in a given crotch point. The second extension at that point may be either a hand portion extension or another digit tube but the first is always a digit tube. Second, at least an independent half stitch is placed on all double needles in preparation for the formation of a digit tube at the crotch point. That is, in at least the late courses of the hand portion or hand portion extension, as the case may be, and prior to the first course of the first tube to be knit at a given crotch point, the double needles are so controlled that at least half stitches will be placed separately thereon and will exist thereon when it is desired to begin the first tube. Third, once a single common stitch has been formed on a pair of double needles and one needle of that pair independently manipulated thereafter to draw at least a separate half stitch, the pair is not manipulated as a unit again. In other words, each pair of double needles may be manipulated as a unit in as many successive courses as desired, one needle of each pair may be knit in as many successive courses as desired and then in the next course knit as a unit with its mating double needle, or after being knit as units in one or more successive courses, the double needles of a pair may be knit independently in as many successive courses as desired, but once the needles of a pair have been manipulated as a unit and then manipulated separately, they are not thereafter manipulated as a unit. Other common features no doubt exist and could be explained but these are deemed most significant.

THE MACHINE OF THE INVENTION

In carrying out the method of the invention as just described, I preferably use a knitting machine of the so-called straight-bed or Lamb type modified in certain respects as will be hereinafter brought out. The basic construction of Lamb knitting machines is very old in the art and only enough of the details of this basic construction will be shown and described herein as is necessary to establish a context for the description of those improvements which are directly related to the invention. For a more complete understanding of the basic construction, reference is made to the prior art, exemplary of which is British Patent 24,265/1893 and U.S. Patent 582,547.

BASIC CONSTRUCTION OF CONVENTIONAL LAMB KNITTING MACHINE

The relevant details of the basic construction are best seen in FIGS. 5 and 6 which are, respectively, a top plan and a side elevation in cross-section. Since the machine consists of two essentially identical sections disposed symmetrically about a central longitudinal axis, parts on one section will be duplicates to a very great extent of parts on the other section; hence, cardinal numeric designations will be used with reference to parts on the left side of FIG. 6 and prime numeric designations with reference to duplicate parts on the right side. As can be seen in FIGS. 5 and 6, two platforms 31 and 31' are held in opposed, upwardly converging relationship by side frames 32, 33 with their upper ends somewhat spaced apart as at 34, and each of the platforms 31 and 31' carry a needle bed 36, 36' suitably grooved along transverse lines to slidably receive a plurality of needles 37. Needles 37 are of conventional design, having a shank 38 with an upwardly projecting butt 39, a bit 40 extending from one end of shank 38, and a hook and latch at the end of the bit. Needle beds 36 and 36' are suitably inclined at an acute angle to the horizontal so that they approach adjacent their upper ends but stop somewhat short of convergence. The arrangement of the needles on the beds is such that their hook ends lie adjacent the upper ends of the beds. Extending across the upper end of each bed 36, 36' is an elongated block 41, 41' which carries an array of sinkers 42 of known design, preferably that described and claimed in my prior Patent 2,877,635 (best shown in FIGS. 13–15) pivoted for movement about a horizontal axis and spring-biased to project their ends downwardly. The sinkers of the sinker array are aligned on vertical planes between the grooves of the needle beds 36, 36' with their front ends extending down into slots provided along the top edge of each bed (see FIG. 13) so as to cooperate with the needles in the formation of stitches during knitting in a manner well known in the art. Extending across the upper surface of each needle bed beneath each of the blocks 41, 41' is a presser bar 44 (see FIG. 6) which is spring-urged downwardly against the bed surface to prevent needles from rising or moving out of their respective slots. Each of the sinkers 42 has a downwardly directed foot 43 projecting into a longitudinal slot 45 formed on each bed somewhat below the top end thereof and just above the locus of presser bar 44.

There is also disposed on the top surfaces of beds 36,

36' in a position below blocks 41, 41' two knitting heads, one for each bed, generally designated 48, 48'. Heads 48, 48' are adapted to slide back and forth longitudinally of the needle beds between side frame 32, 32' and carry various cams for actuating the knitting needles in the beds as well as the sinkers of the sinker arrays 41, 41'. At their front ends, the knitting heads are supported by guide rods 50, 50', one for each head, extending across the machine above corresponding needle beds with their ends held in side frames 32, 33, the heads being provided at their top front corners with integral collars or bosses 52 for sliding engagement with the guide rods. At their lower or rear ends, the respective heads slideably rest on rails 54, 54' which extend across the lower ends of the needle bed surfaces and are secured at their lateral terminations to solid portions of the beds or the platforms. End portions of rails 54, 54' can be seen in FIG. 5 and cross-sections thereof in FIG. 6. It is necessary that the heads 48, 48' be traversed back and forth longitudinally of the needle beds 36, 36' and this is accomplished by attaching the lower ends of the arms of an inverted U-shaped yoke 56 to the heads 48, 48' and driving the yoke with a straight line reciprocatory motion through a connecting rod 58 and a crank wheel 60. Power is supplied to crank wheel 60 in any suitable way, not shown. Yoke 56 also carries one or more yarn feed guides 62, visible in FIG. 6, by means of which the yarn to be knitted is fed or laid into the space between the upper ends of the needle bed to be engaged by the needle hooks and formed into stitches.

The details of construction of the knitting heads are best shown in FIGS. 7 and 8 which are a perspective and bottom plan view, respectively, of one such head. As has already been indicated, heads 48, 48' carry various cams for actuating the needles 38 during the knitting operation by engagement with butts or lugs 39 on needles 37 as well as cams for actuating the sinkers in conjunction with the movement of the needles. These cams are mounted on the under surface of the knitting head and appear most clearly in FIG. 8. Only one head will be examined in detail here since either the heads are the same or such differences as might exist are well known in the art and form no part of the invention. For present purposes, they are preferably identical. The basic structural member of each knitting head is a generally rectangular base plate or frame 66 with which collars 52 are integral. In the center of the bottom face of the base plate 66 is a generally rectangular recess 68 wherein the principal needle actuating cams are positioned. Adjacent the top end of recess 68, that is, the end thereof nearest the heads of the needles, is a top cam 70 including two concave cam surfaces 71, 71a disposed symmetrically with respect to the transverse axis of the knitting head and having at its midpoint between surfaces 71, 71a a freely swingable elongated cam finger 72. It is the top cam which principally determines the length of the stitches drawn by the needles during the knitting operation and to permit this length to be adjusted, top cam 70 is mounted on a block 73, the transverse position of which relative to the upper or front edge of recess 68 is capable of variation. Adjustment of block 73 is actually effected through the medium of an eccentric located within the interior of the knitting head and not visible in the drawings, which eccentric can be rotated by a square-headed stud 74 (see FIGS. 7 and 11). A visible indication of the position of the eccentric and hence of the position of block 73 is furnished by a graduated dial 76 positioned on the upper face of base plate 66 and secured to stud 74 for rotation therewith.

Looking again at FIG. 8, spaced away from top cam 70 toward the back or lower end of the head is a pair of inclined cams 78, 78a positioned one on either side of the swinging cam finger 72. One of these cams serves as the main lift cam and the other serves as a drawing down cam dependent upon the direction in which the knitting operation is to take place. These cams preferably are more or less similar in shape and generally symmetrically arranged on either side of the transverse axis of the knitting head passing through the pivot axis of the swinging cam finger 72.

For reasons that will be hereinafter explained, it is necessary that the lift and drawing down cams 78, 78a be movable towards and away from top cam 70. To this end, cams 78, 78a are, respectively, carried by blocks 80, 80a mounted for sliding movement on pairs of spaced parallel guide rods 82, 82a. The position of blocks 80, 80a is controlled by a slide bar 84 passing longitudinally through the knitting head about midway of its transverse dimension and projecting exteriorly of the sides thereof. A pin and slot connection (not shown) exists between slide bar 84 and each of cam blocks 80, 80a so that as slide bar 84 is moved longitudinally, blocks 80, 80a move transversely along the guide rods. The curvature of the last-mentioned slot is preferably such that considerable choice in the positions of blocks 80, 80a and, thence, cams 78, 78' relative to each other and to top cam 70 is possible dependent upon the longitudinal position of slide bar 84. Preferably, slide 84 is retained until forceably removed therefrom in any one of several predetermined longitudinal positions indicated by n notches 86 (FIG. 8, right side; FIG. 11, left side) by means of a spring biased detent 88 shown largely in dotted lines in FIG. 8, the inner end of which engages notches 86.

At the lower or back end of recess 68 is a cam plate 90, the ends of which are inclined as at 92 and 94 to function as preliminary lift cams. For present purposes, this cam may be held in fixed position and is therefore shown in FIG. 8 as attached by screws to base plate 66 of the knitting head. Normally, the preliminary lift cam of a Lamb knitting machine is made in one or more pieces and is capable of movement relative to the main lift cam through the medium of a slide bar 96 connected to the preliminary lift cam through a pin and slot arrangement and releasably held in predetermined positions by a detent pin 98, spring biased into engagement with slide 96 by a leaf spring 100. Since slide 96 and its associated detent mechanism play no part in the present invention, they can be omitted, if desired, although there is no harm in leaving them in position on the head in the event the machine may be employed for other types of knitting.

In accordance with the present invention, the inclined surfaces 92, 94 of cam plate 90 function only to align the butts 39 of the knitting needles in the event the needles have become accidentally displaced too far downwardly in the needle bed. They do not perform the usual function carried out by the preliminary lift cam of the Lamb knitting machine, viz., of raising the needles through engagement with the butts thereof up to a point at which the butts would be engaged by the main lift cam. This change in function is necessary since it is essential to carrying out the method hereof that the butts of the needles always be free to pass below the lower edge of main lift cam 78 of 78a, as the case may be, so as to be left out of, or disengaged from, the knitting operation. Thus, when the cam blocks 80, 80a and cams 78, 78a associated therewith are in operative position, there is always a gap or space between the lower edges of both of cams 78, 78a and the upper edge of cam plate 90. In order to lift the needles through this space or gap, another mechanism is utilized which will be hereinafter described in detail.

For purposes of this discussion, it is merely necessary to assume that the butt of a particular needle to be knitted, after alignment by one of the preliminary lift cam surfaces 92, 94 during a traverse of the knitting head, is then lifted in some way to the point where it will be engaged by the lower edge of the lift cam as the traverse of the head continues. Upon further movement of the knitting head, the lift cam engages the butt of this particular needle, raising the needle higher within the needle bed and causing the hook end of the needle to be projected into the space between the needle beds. Continued movement of the knitting head causes that cam surface 71 or 71a of the top cam 70 which is on the same side as the lift cam, to engage the butt of the needle and lower the needle to an extent sufficient to clear the trailing end of that cam surface. The needle butt will then be engaged by swingable cam finger 72 after the latter has swung due to the resistance of the needle over to its extreme trailing position in contact with the drawing down cam. The swinging cam and drawing down cam next act sequentially on the needle butt to continue the depression of the needle until the lower limit of the drawing down cam is reached. As the needle is depressed, of course, the thread being knitted is engaged in the hook thereof and is pulled against and between the sinkers on either side of the particular needle to draw a stitch.

As already indicated, the top cam is shaped symmetrically with respect to the transverse axis of the knitting head while the cams 78, 78a are substantially similar in shape and are likewise symmetrically arranged with respect to the axis of the head so that either of these cams is capable of serving as the lift cam with the other serving as the drawing down cam. Thus, the head is adapted for knitting in either direction although it will be understood that once the machine is set up for a given mode of operation, one head will be operative to cause knitting by its assoicated bed of needles as the yoke and heads are reciprocated in one direction and the other head will be operative to cause knitting of its associated bed of needles as the yoke and heads reciprocate in the return or opposite direction.

Up to this point, the discussion has been confined to to the needle cams of the knitting head but it should be kept in mind that the knitting head also carries the cams for actuating the sinkers. The sinker cams are carried one the top or front end of the knitting head, that is, the end of the head closest the needle hooks, in spaced relation to the upper surface of the needle bed (see FIG. 6) and consist of a pair of fixed end cams 102, 102a, one secured to the base member 66 of the knitting head at each of the top corners thereof generally beneath collars 52, and a movable center cam 104, the details of these cams being best shown in FIG. 8. Center cam 104 is inclined at each of its ends and is adapted to slide freely within a slot 106 so that its position is always trailing with respect to the transverse axis of the knitting head passing through the axis of swinging cam finger 72. Slot 106 is formed in a plate 108 which is adapted to be projected or retracted relative to base member 66 to position cam 104 with respect to the fixed cams 102. The mechanism for positioning plate 108 consists of a slide bar 110 mounted for reciprocating movement along its longitudinal axis in two posts 112, 112a upstanding from the top surface of the knitting head (see FIG. 7). A pin and curved slot connection is provided between slide bar 110 and plate 108, the sl ot of which is slightly visible in FIGS. 7 and 11 at 114, and the curvature of slot 114 is such as to shift plate 108 in the desired manner as slide bar 110 is reciprocated. Formed on the top edge of slide bar 110 are one or more notches 116 for engagement with a detent 118 extending downwardly within one of the posts 112, 112a and biased by a spring 120 toward the slide bar. By virtue of the engagement of detent 118 with notches 116, slide bar 110 and plate 108 associated therewith can be located in any one of several predetermined positions corresponding to the notches at which positions they will remain until forceably changed by reciprocation of the slide bar.

In order that the longitudinal position of slide bar 84, slide bar 110, and any other slide bars carried by the knitting head may be controlled automatically during the knitting operation, there is arranged at the rear corners of the upper ends of each of side frames 32, 32' a plurality of stops or bumper pins 122, 122' (see FIG. 5), one for each of the slide bars on the head, which are preferably in the form of bolts having threaded engagement with apertures prepared for this purpose on the side frames. These bumper pins are so located on the frames as to be in alignment with the ends of the corresponding slide bars and are of such length as to project inwardly of the frames to a point where they will be hit by the ends of the slide bars when the knitting head reaches the extreme limits of its traverse. By advancing or withdrawing the pins in their apertures, their position can be adjusted to locate their ends in any predetermined position relative to the ends of the slide bars. In this way, the slide bars can be made to shift longitudinally at each end of each stroke of the knitting head to any desired extent as determined by the pre-selected positions of the bumper pin ends.

As already stated, the sinkers of the sinker array are normally spring biased to a depressed position at which their thread engaging ends project downwardly between and below the upper ends of the needle grooves in the respective needle beds. The function of the fixed sinker cams 102, 102a is to insure that the sinkers are in this depressed position at the time that they are reached by the knitting head while the function of sliding cam 104 is to elevate the thread engaging ends of the sinkers in properly timed relation to the actuation of corresponding knitting needles by the needle cams. As can best be seen in FIG. 14, the sinker cams act upon the upwardly directed tails 46 of the sinkers to pivot the sinkers counterclockwise (in this figure) and lift the hook ends relative to the needles and the stitches carried on the needles. By adjusting the position of the center sinker cam 104 inwardly and outwardly with respect to the fixed end cams 102, 102' through the medium of slide bar 110 and plate 108, it is possible to control the extent the sinker ends are elevated as well as to remove the center cam entirely from operative contact with the sinkers. The preferred method of operating the sinkers is disclosed and claimed in U.S. Patent 2,877,635.

Up to this point, all of the parts described and their associations one with another are conventional with Lamb knitting machines and have no especial relationship as such to the present invention. For this reason, it should be understood that the shape and arrangement of these various parts are subject to considerable modification and variation in ways well known in the art. The invention should not, therefore, be interpreted as limited to the specific features and details of the mechanism so far described.

IMPROVEMENTS IN LAMB KNITTING MACHINE

Turning now to a consideration of the modifications and alterations in the basic construction of the Lamb knitting machine by which it is specially adapted to the practice of the previously described method, these improvements fall into two general categories: first, those having to do with the provision at certain points of reserve or extra needles having an initial inactive status but adapted for activation in simultaneous paired relationship with initially active needles so as to produce single stitch loops upon each pair of the needles so activated, corresponding needles of such pairs being thereafter deactivated during the knitting of the particular portion of the article in question with the result that the deactivated needles hold in their hooks stitch loops which are adapted to serve as foundation loops when the deactivated needles are activated for the purpose of knitting the next adjacent portion of the article; and second, the provision of a mechanism by which all of the needles contained in the needle bed of the knitting machine may be selectively and individually introduced into and removed from the knitting operation.

It will be recalled from the discussion in the previous section of this specification that the method of the invention contemplates and requires the presence in the vicinity of the crotch points between the thumb and adjacent hand portion and between adjacent finger tubes of at least one, and usually more than one, needle or needles denominated herein as reserve or inactive needles, which are adapted to be maintained inactive during the knitting of the wrist and hand portions of the glove and are activated during knitting of the thumb and finger tubes only at certain predetermined times and for certain predetermined intervals. The needle bed of the Lamb knitting machine like all conventional knitting machines is formed with a plurality of equally spaced grooves or slots, each of which is adapted to receive a single knitting needle. This arrangement lends itself poorly, if at all, to the practice of the method herein, even assuming that a suitable needle control mechanism were available and utilized, for two reasons. First, if certain of these needles were disengaged from the knitting operation, the space left by the omission of such needles between those needles actively engaged in knitting would result in a noticeable distortion in the corresponding wales of the finished article. The second and more serious objection arises by virtue of the fact that in the conventional Lamb machine, a sinker is positioned between each adjacent pair of needle slots at the upper ends of the respective beds and it is impractical because of space limitations, if not impossible, to selectively and individually remove the sinkers entirely from the knitting operation. Unless the sinkers can be so removed, the formation of a single stitch or loop on two simultaneously activated adjacent needles is prevented by the inherent action of the sinkers between and on each side thereof. These difficulties are overcome according to the machine of the present invention by enlarging the slots provided for the reception of needles in the needle bed and positioning in each of the enlarged slots two needles of suitable gauge separated throughout substantially a major portion of their length by means of a thin divider element.

This feature will be more readily understood by specific reference to FIGS. 9 and 13–15. It will be noted from these figures that each of these needle beds 31, 31' is provided with a plurality of grooves 128, which are considerably wider than is the case with conventional Lamb type machines and that there is disposed in certain of the enlarged grooves 128, two of the needles 38 spaced slightly apart by means of an intervening elongated, thin, rectangular blade-like divider or spacer element 130. The needles 38, of course, have a reciprocatory motion during knitting and since the spacers are in side by side frictional contact with the needles, there is a tendency for the spacers 130 to move along with the needles. The movement of the spacers in this fashion cannot be tolerated and for this purpose, each spacer is provided with a downwardly depending tab or tongue 132 preferably located adjacent the upper end thereof. Tongues 132 engage in a slot 134 extending longitudinally across each of the beds 31, 31' preferably at a loci spaced slightly downwardly away from slot 45. In this way, the spacers 130 are held against reciprocatory motion. Alternatively, spacers 130 could be constructed with downwardly directed projections at both ends and adapted to fit around the edges of both the upper and lower ends of the needle beds and thereby retain the spacers in place. The tongue and slot arrangement is, however, considered more desirable.

The arrangement in a single groove of two needles separated by the thin spacer has the advantage of minimizing the distance separating each of such needles from the needle in the next adjacent groove an intervening needle is held inactive, even though the needle grooves are somewhat larger than is normally the case, since the spacer is much thinner than a normal land on the bed. As a consequence, it has been found that gloves produced by means of double needles in enlarged grooves are free of distortion in the corresponding wales and, in fact, appear the same as conventionally produced gloves. While the space between alternative needles of adjacent pairs of double needles is necessarily slightly greater than the space between two adjacent conventional needles, the length to which the stitch loops are drawn during the knitting operation is sufficiently greater than this distance that any discrepancy between adjacent wales in unnoticeable.

It is within the scope of the invention to enlarge every slot in the needle bed for the reception of a double needle and spacer combination; however, ordinarily the double needle and spacer combination will be provided only in an appropriate number of slots in the vicinity of each of the crotch points of the glove to be knitted. For this reason, it is only essential to the practice of the invention that these particular slots be enlarged, the others being left unaltered. Obviously, greater flexibility in producing a variety of sizes and styles of gloves, the crotch points of which would occur at different sites on the needle bed, will result where all of the slots in the needle beds are enlarged since this permits the location of the double needle and spacer combinations to be varied at will to suit the style and size of the glove being knitted. To this end, it is possible for every slot to be occupied by a double needle and spacer combination, the machine being operated in such a way that only one needle of each two double needles actually takes part in knitting except in the case of those particular slots adjacent crotch points of the glove to be knit wherein the double needles are actuated together and separately as has been explained. Preferably, however, as indicated in the drawings, in particular FIGS. 9 and 11, the position of the needles and spacers is reversed in those slots wherein only one needle is operative during the entire knitting operation, that is, one needle is placed in the center of each of the slots and spacers placed on each side of the needle to fill out the slot. The latter arrangement is, in effect, the same as providing enlarged slots only adjacent the glove crotch points and normal slots elsewhere.

Reference has already been made to the necessity at certain times for actuating the double needles in simultaneous paired relationship, i.e. as a unit, to draw a single stitch thereon. Normally, the conventional draw down cam of the knitting cam array contacts successive needles in sequence to produce a so-called "needle wave," in which adjacent needles occupy slightly different positions in the needle bed since they contact the drawn down cam at different points along its inclined edge. If a conventional draw down came were employed in the present machine, the needles of the double needles, though spaced more closely together than usual, would still occupy different bed positions. This has been found unsuited to the invention and, consequently, the drawn down cams and both of the double needles have been modified so that the double needles can, in fact, be actuated as one needle. This is best shown in detail in FIG. 10, an inverted perspective view of an enlarged drawn down cam 78 and the butts of a pair of double needles in operative position relative to the cam. As shown in this figure, a step 81, 81a defining a shoulder 83, 83a is provided on the interior edge 79, 79a of each of cams 78, 78a, which edge is operative when such cam is functioning to draw the needles down, and the butt of that needle of each pair of double needles which is leading with respect to that edge is foreshortened as at 39a. The distance between the normal interior edge 79, 79a of the cam and the shoulder 83, 83a of step 81, 81a is selected to equal the distance between corresponding side faces of the butts of the double needles. By virtue of this arrangement, the foreshortened butt 39a will pass beneath the normal interior edge of the cam and will contact the shoulder of the step at the same time as the normal length butt 39 will contact the normal inner edge of the cam. Hence, the motion of the double needles when activated together by the modified cam will be identical and the double needles will move as a single needle and draw a single stitch.

As already indicated, it is intended that each knitting head shall be capable of operation in either direction and, for this reason, each of the inclined cams 78, 78a is provided on its interior edge with a step as can be seen in FIG. 8 at 81 and 81a. Obviously, if a machine is constructed for operation of its heads in only one predetermined direction, only that one of the two cams on each head which is trailing with respect to the direction of the particular head during knitting and is therefore functioning to draw down the needles, need carry a step on its interior, i.e., leading edge. To assure understanding of what is meant here and to avoid confusion, if a given head be assumed to move in a given direction, say that of the arrow at the top of FIG. 8, the first or leading inclined knitting cam of the head, in this case cam 78, has the role of main left cam and its leading or exterior edge 85 operates on the needle butts of the needles in the bed associated with this head to lift these needles as the head moves in the given direction. The trailing or interior edge 79 of this cam 78 serves no purpose so long as the assumed direction of knitting is maintained. Under the assumed conditions, the last or trailing cam, in this case 78a has the role of drawing down cam, and its leading or interior edge 79a acts upon the butts of the needles to draw the needles down to form stitches while the trailing or exterior edge 85a of this cam 78a has no function. Of course, if the direction of knitting were to be reversed, then the function of the two cams would be likewise reversed as would their functioning and functionless edges.

The selection and positioning of the needle with a foreshortened butt 39a and the needle with a normal length 39 of each pair of double needles is simplified by the knowledge that the short butt needle must always precede, or be in a position leading, the long butt needles of each pair relative to the direction of knitting. In other words, the position of the short butt needle in each pair must be such that this needle is reached first by the knitting cams. Since the needles in one bed or knitted in the opposite direction from those in the other bed, this means that the position of the two types of needles in corresponding pairs of double needles on the two beds will be reversed.

In FIG. 8, steps similar to step 81 are shown on the exterior edges of cams 78, 78a as at 87 and 87a, on the top cam 70 as at 89 and 89a and on the edges of the pivoted finger 72 as at 91. In this way, the pairs of double needles will be operated as a unit, when so desired, through the entire course of their movement during knitting. These additional steps are shown primarily for the purpose of emphasizing the fact that the double needles function as a unit at those times when this is intended. In actuality, such additional steps are unnecessary because only when the needles are brought into engagement with the yarn, i.e., during drawing down, does unitary functioning become important. Thus, when the needles are lifted preparatoriy to engaging the yarn, slight differences in the position of the needles in each pair of double needles, as in a normal "wave," are immaterial. Where, in the claims, a pair of double needles is described as being actuated as a "unit," it will be understood that only unitary actuation, i.e. identical motion together, during drawing down is necessarily intended.

The other general category of improvements made on the conventional Lamb type knitting machine relates to the attainment of control over the operation of individual needles. Obviously, it is not possible to maintain selected needles disengaged from the knitting operation while knitting is carried out on the remaining needles and to vary the particular needles disengaged from or engaged in knitting without the use of some kind of patterning mechanism by which the actuation of individual needles is controlled. While it is broadly known to associate a pattern mechanism with a Lamb type knitting machine, there is disclosed in the drawings an improved type of mechanism which has been found especially well-suited for the purposes of the invention.

Basically, this improved needle control mechanism consists of a pattern cylinder or drum carrying on its periphery rows of teeth corresponding to the needles to be actuated in each of the courses to be knitted, and an array of pivotally mounted needle displacing fingers which are pre-set by the action of the teeth on the pattern cylinder in accordance with the needles to be activated in a particular course, and an actuating cam carried by the knitting head which, during the travel of the head, acts upon the needle displacing fingers to cause the selected needles to be displaced upwardly in the needle bed to a point at which the butts thereof will be engaged by the knitting cams on the knitting head.

Referring now to FIGS. 5 and 6, an open U-shaped frame 136, 136' extends downwardly and outwardly from the lower end of each of the platforms 31, 31' at generally the same angle of inclination as the platforms so as to constitute an extension of the platforms, and it is upon these frames that the pattern mechanism is mounted. The corners of the remote ends of frames 136, 136' are supported by pairs of struts 138, 138' which are connected at the lower ends thereof (FIG. 16) to the original side frame 32, 32' of the machine by horizontal stringers 139. At the lower end of each of the extension frames is a pair of pillow blocks 140, 140', one block of each pair being located on each side of the frame, and a shaft 142, 142' is journaled in each pair of pillow blocks. Mounted on each of shafts 142, 142' for free rotation therearound is a pattern cylinder drum 144, 144', there being one such cylinder for each needle bed 36, 36'. The periphery of each pattern cylinder is provided along closely spaced loci extending parallel to the cylinder axis with a plurality of radial outwardly opening slots 148, one for each course of the article be knitted, each slot being adapted to receive a pattern strip 150. The movement of the needles in each bed during each course of knitting is controlled by a corresponding pattern strip and for this purpose, each pattern strip is formed along its radially outer edge with a plurality of spaced teeth 152 which are broken off or left intact dependent upon whether the particular needles to which they correspond are to be withheld from the knitting operation or actively engaged therein.

In order to control the movement of the needles in the beds during the knitting of successive courses constituting the article, it is necessary that the pattern drums be rotated step by step to present successive strips to an operaive position as hereinafter described. As before, cardinal numerals refer to parts on the left side and prime numerals to corresponding parts of the right side. While there are various known means of causing step-by-step rotation of the cylinder, that could be employed here, for the purpose of illustration there is shown in the drawings a mechanism of the the ratchet and pawl type which has been found entirely suitable. As can be seen in FIG. 6, at least one end of the pattern drums 144, 144' is constructed as a ratchet or toothed wheel 152, 152'. Engaging with the teeth of ratchet wheel 152, 152' is a pawl 154, 154' carried by one end of an arm 156, 156' in the form of a rectangular plate rigidly mounted adjacent the other end on shaft 142, 142' in slightly spaced relationship to the corresponding wheel. Pawls 154, 154' are releasably urged into engagement with the teeth of the wheel by means of spring 157, 157'. Keyed to each shaft at another location along its length, i.e., adjacent side frame 33, is a generally downwardly extending crank 158, 158' connected at its lower end to a driving means which is adapted to oscillate the cranks and thus shaft 142, 142' and arms 156, 156' just in advance of the initiation of each course of knitting.

The cylinders 144, 144' are freely rotatable on shafts 142, 142' and must be restrained against backward rotation as the arms 156, 156' and pawls 154, 154' swing rearwardly preparatory to the next advance. To this end, a brake post 159 is arranged on extension frame 136, 136' adjacent each end of cylinders 144, 144' (see FIGS. 5 and 6), the inside face of these posts carrying a larger amount of friction material 151 in frictional contact with the outer surface of the cylinder ends.

If desired, each of the cranks 158, 158' can be actuated by an independent mechanism but, preferably, a single driving means is employed for both cranks as this insures that they operate in proper relation to each other. Such an arrangement is shown in FIGS. 6 and 16 and in these figures, the lower end of crank 158 is pivotally connected to a link 155 while the lower end of crank 158' is pivotally connected to link 160. Adjacent side frame 33 beneath the needle beds is a generally T-shaped operating member 240 pivoted at the center of the crossbar of the T on a stud 242 projecting inwardly on frame 33. The member 240 is disposed with the cross-bar thereof extending in a generally vertical direction with the upper end of the cross-bar pivotally connected to the free end of link 155 as at 244 and the lower end thereof pivotally connected to the free end of link 160 as at 246. The leg or "upright" of the T lies horizontally and is joined at its free end as at 248 to a generally vertical link 250.

Referring now to FIG. 16, arranged below the T-shaped member 240 is a cam 252 carried on the conventional main axle 254 of the machine. Cam 252 has a circular peripheral cam surface except for a lobe 256. Pivoted on side frame 33 on a pinion 258 at one side of axle 254 is a follower arm 259 extending beneath cam 252 and having a roller 260 at the end thereof which roller is in contact with the peripheral surface of cam 252. The free end of link 250 is pinned to arm 259 at a point intermediate to ends as at 262. To maintain roller 260 against the peripheral surface of cam 252, T-shaped member 240 is biased clockwise in FIG. 16 by a spring 264.

The operation of the above-designed system of cranks, links, etc. will be obvious. As lobe 256 reaches roller 260 during the rotation of cam 252, follower arm 259 will be rocked downwardly about pinion 258, rocking T-shaped member 240 counterclockwise. The motion of the ends of the cross-bar of member 240 will be transmitted in opposite directions to the ends of cranks 158 and 158', rocking shafts 142, 142' and pawl-carrying arms in opposite directions to advance cylinders 144, 144' through an equal arc of rotation. When lobe 256 passes beyond roller 260, all parts return to their original position under the action of spring 264, pawls 154, 154' backing the necessary distance around toothed wheels 152, 152' which are held against rotation by the frictional material 151 on brake posts 159, 159'. By appropriate choice of the length of the various lever arms involved and the throw of roller 260 by lobe 256, the motion of pawl-carrying arms 156, 156' can be adjusted to correspond to the peripheral spacing of the strips 150 on cylinder 144, 144'. Similarly, the timing of the change in strips is controlled by the radial position of the leading edge of lobe 256 relative to the cycle of the machine as determined by axle 254 and normally, the position of cam 252 is such that the cylinders are advanced after the finish of the cycle during which one course of yarn is knitted and before the start of a cycle to knit the next course.

Very often a succession of courses in the knitted fabric will be identical and it is more convenient to repeat the operations dictated by two corresponding strips on the pattern cylinders than to provide a series of identical strips on the cylinders. The machine is equipped to do this in the following manner, again referring to FIGS. 6 and 16. The existence of a slight space between each arm 156, 156' and the adjacent face of the ratchet or toothed wheel 152, 152' at at least one end of cylinder 144, 144' has already been noted. In these spaces are located elongated, thin pawl-controlling arms 161, 161'. These arms are preferably operated from a single mechanism mounted for space consideration at one end of the machine so that their respective configurations are necessarily somewhat different. Thus, arm 161 (on the left in FIG. 6) is roughly in the shape of a dog-leg having an upper leg 162 and an angular lower leg 163 while in the case of arm 161' (on the right) lower leg 163' is merely a tapering longitudinal extension of upper leg 162'. Both arms are journaled for free rotation on shafts 142, 142' at their approximate mid-point and the upper legs 162, 162' are identical in configuration and in radial relationship to shafts 142, 142'. The extreme upper ends of each of legs 162, 162' projects slightly above the periphery of one toothed wheel 152 or 152' at this point and is formed with a transverse edge 164, 164' and a downwardly and forwardly extending oblique edge 165, 165' formed by cropping the forward corner of the upper ends of the legs. These edges function as cam surfaces for pawls 154, 154' by contacting inwardly projecting pins 166, 166' provided on the pawls at the forward, tooth-engaging ends thereof.

It must be understood that pawl-controlling arms 161, 161' are adapted to move independently of pawl-carrying arms 156, 156' and shafts 142, 142', and hence are capable of acting upon the pawls when the latter are at rest. The normal or inoperative position of arms 161, 161' is with their forward oblique edges 165, 165' beneath the pins 166, 166' on the pawls which allows the pawls to engage the teeth on wheels 152, 152' to advance the same when the pawl-carrying arms are rocked forwardly. When it is desired to repeat a given course by allowing the two corresponding pattern strips to remain in operative position, the arms 161, 161' are rocked forward to place their transverse edges 164, 164' beneath the pins 166, 166'. The transverse edges hold the pawls out of engagement with the teeth of wheels 152, 152' and the movement of the pawls is not transmitted to the pattern cylinders.

The operating mechanism for the pawl-controlling arms is as follows: At their extreme lower ends, legs 163, 163' of arms 161, 161' are pivotally connected to links 167, 167', respectively, the former extending generally vertically downwardly and the latter generally horizontally across the machine below the needle beds. Located beneath the frame extension 136 at the left end of the machine (left side of FIG. 6) is a bell crank 168 mounted by pivotal movement about a pinion 170 which is supported in a bracket 171 resting on a cross-brace 172 bridging standards 138. Link 167 has its lower end pivotally connected to the lower or horizontal leg 173 of bell crank 168. Connecting link 167', on the other hand, has its free end pivotally joined to the upper or vertically extending leg 174 of crank 168. The inner termination of lower crank leg 173 is formed with a downwardly projection 175, inclined along its inner edge, to function as a cam follower for engagement with a plurality of cam blocks or teeth 176 arranged at spaced intervals around the periphery of a drum 177. The follower end 175 of crank leg 173 is urged into contact with the periphery of drum 177 by a spring 178 connected at one end to the upper leg 162 of crank 161 and at the end to the side frame 33 of the machine.

Drum 177 is itself supported on a shaft 179 rotatably journaled at its ends in pillow blocks 180 which are mounted on either side of the machine on stringers 139. Shaft 179, and therefore, drum 177, are rotated in any suitable way from any convenient source of power such as by the timing chain of the conventional machine. It is common practice in this art to drive secondary shafts or axles in timed relation to the main driving axle of the machine through a timing chain or pattern chain and, consequently, it is believed unnecessary to illustrate a specific drive for shaft 179. All that is necessary is that bell crank 168 be rocked to cause disengagement of the pattern cylinder pawls whenever a course of knitting is to be repeated, the rocking of crank 168 being, of course, effected by rotating drum 177 sufficiently to remove a tooth 176 from beneath projection 175. Then, when a different course is to be knitted, the drum is rotated to present a new tooth beneath projection 175 which rides up on the tooth, rocking crank 168 and arms 161, 161' to allow pawls 154, 154' to once more engage the toothed peripheries of wheels 152, 152'.

From what has been said, it will be borne in mind that the operation of the knitting needles of the knitting bed during the knitting operation is determined in accordance with the presence or absence of corresponding teeth 152 on the pattern strip 150 matching a particular course of yarn to be knitted. However, in accordance with the present invention, teeth 152 do not act directly upon the needles in the needle bed but rather act indirectly through the medium of a compound system or array of pivotable elements or fingers interposed between the pattern strips and the needles.

This features is best explained with reference to FIGS. 6, 11, and 13–15. The frame in which this compound system or array is supported consists of pairs of end posts 182, 182' projecting vertically from each of the extension frames 136, 136', one post of each pair being located generally adjacent each rear corner of the corresponding needle bed, and a cross bar 184, 184' extending between each pair of end posts at the upper front corner thereof and firmly affixed at its terminations to the end posts. Also extending between each pair of posts 182, 182' are two supporting rods, the first or upper rod 186, 186' being located behind the associated cross-bar and the second or lower rod 188, 188' being located beneath the cross-bar about midway of the vertical dimension of the posts and adjacent their front edges. There is suspended from each upper supporting rod 186, 186' for free pivotal movement therearound a spaced series of elongated elements 190, 190' herein referred to as positioning fingers which elements are roughly in the shape of a narrow L and have an aperture adjacent the upper ends thereof for penetration by the rod. Each of the positioning fingers is provided on its rear edge somewhat closer the free end thereof with a rearwardly directed projection or tongue 192 which is adapted for engagement with a tooth 152 on the pattern strips 150. The lower front end of each finger is formed with a shallow concavity as at 194 (see FIGS. 13 and 14). Suspended, on the other hand, from each lower supporting rod 188, 188' for free rotation therearound is a similar spaced series of elongated elements 196, 196' herein referred to as kicker fingers, each having a transversely elongated aperture 198 located slightly above its center through which rod 188 passes and a toe 199 at its lower end. On the rear edge of each kicker finger behind the elongated aperture 198 is a convex extension 200 which is adapted to seat against the concavity 194 of the corresponding positioning finger 190. The kicker fingers 196, 196' extend downwardly at their lower ends so that toes 199 are aligned behind, and adjacent to, the back ends of the shanks 38 of the needles in the associated needle bed. The beds are preferably extended outwardly, i.e. toward pattern cylinders 144, 144', a sufficient amount that the toe ends 199 of the kicker fingers fit within the back ends of the needle groove 128 on the upper surface of the beds. The grooves at this point may be deepened as at 201, to allow for the arcuate movement of the toes. In this manner, proper alignment of the kicker fingers with the needles is maintained and any possibility of the fingers jamming upon attempted entry to the back ends of the needle slots is prevented. The thickness of the fingers is necessarily not greater than the gauge of the needles.

Figure 17:
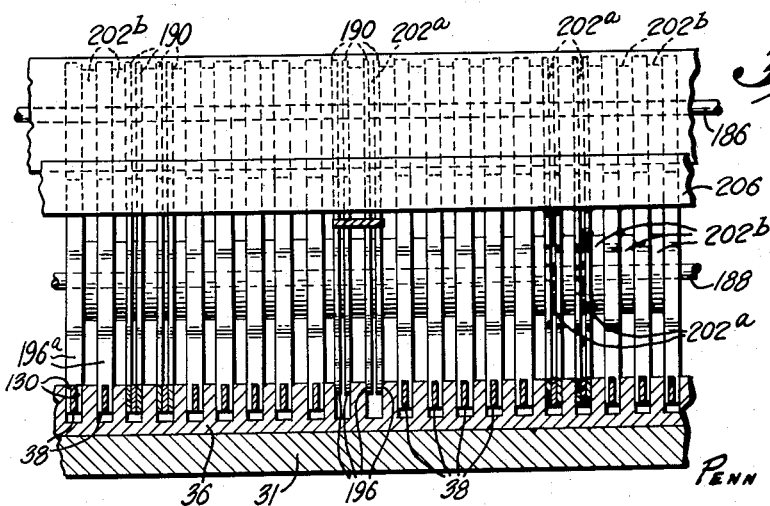
FIG. 17 is an enlarged detail view taken substantially along line 17—17 of FIG. 14 showing a number of the needle actuating fingers in end elevation and a portion of the needle bed in section.

As is best shown in FIG. 11, kicker fingers 196 and positioning fingers 190 in each array are so arranged that one finger of each type is provided for each needle of each needle bed, the plane of the two fingers being in vertical alignment with the axis of the corresponding knitting needle. The proper spacing of the fingers along their respective supporting rods to achieve this arrangement is secured by interleafing spacers 202 of proper width with the fingers. Thus, for those slots of the needle bed which contain the previously-mentioned double needle and spacer combinations, there will be provided two kicker fingers, one for each of the needles in the combination, separated by a thin spacer 202a equal in width to needle spacers 130 and two positioning fingers, one for each kicker finger, separated by a similar spacer. For those slots which contain only a single operative needle, preferably centered between two spacers in the event all of the needle grooves are enlarged, there need be provided only one kicker finger and one positioning finger. In the latter case, it is more advantageous for the thickness of both the corresponding kicker and positioning fingers to equal the entire width of the enlarged slots (but containing a single needle) to improve their rigidity and durability. With the thickened fingers designated 196a, the spacers associated with the single needles are foreshortened at their rear ends as at 203 (see FIG. 9) to afford clearance for the thickened kicker fingers to swing in the needle slots. The preferred relationship just described is quite clearly revealed in FIG. 9 showing the two lower slots each containing a pair of double needles 38 separated by a spacer 130, each needle thereof with its own kicker finger 196 contacting the shank end thereof, and the upper slot containing one needle 38 between two shortened dividers and a thickened kicker finger 196a. This relationship on a more extensive scale is also shown in FIGS. 11 and 17.

Between the thickened fingers, one thickened finger and a next adjacent thin finger, or thin fingers in adjacent grooves are wide spacers 202b equal in thickness to the lands between the needle grooves.

The role of the positioning fingers 190, 190' is actually that of establishing the fulcrum about which the kicker fingers 196, 196' pivot. Since slots 198 in the kicker fingers are transversely elongated, the position of the fingers with respect to their supporting rod 188, 188' can be shifted within the limits of this slot. If a particular kicker finger is unsupported from behind by a positioning finger, the action of gravity on the kicker finger will cause it to assume a retracted or backward position on the rod, i.e. with the rod at the front end of the slot, whereas if the particular finger is supported from behind, it will assume a projected or forward position on the rod, i.e. with the rod at the rear end of the slot. Whether or not the particular kicker finger is supported from behind depends, in turn, upon the presence or absence of a tooth 152 on the pattern strip 150 at the point along the strip contacted by the particular positioning finger 190. If a tooth is absent at this point (see left side of FIG. 6) the positioning finger assumes a retracted position, leaving the corresponding kicker finger unsupported so that it shifts downwardly and rearwardly on the rod likewise to retracted position, while if a tooth is present (see right side of FIG. 6) the positioning finger will assume a projected position, forcing the kicker finger forwardly to projected position and supporting the kicker finger from behind in this projected position so long as the tooth is present. The upper ends of the kicker fingers are prevented from swinging too far forwardly under the influence of gravity by means of keeper bars 206, 206' secured at their ends to the respective pairs of end posts 182, 182' and extending therebetween in front of the upper ends of the respective series of fingers 196, 196'. It will be understood that as the pattern strips 150 are changed by the rotation of the pattern cylinders, all of the positioning and kicker fingers controlled thereby are positioned simultaneously.

The positioning fingers and kicker fingers do not alone function to change the position of the needles in the needle beds. Instead, this particular function is carried out by means of a kicker cam assembly operatively mounted on each knitting head of the machine, which assembly, as the head makes its traverse, acts through its cam upon the upper ends of those kicker fingers which are in projected position as just explained, pivoting these kicker fingers about their fulcrum provided by corresponding positioning fingers, and causing the lower ends or toes 199 of the kicker fingers to swing in corresponding needle grooves and displace or raise corresponding needles of the needle bed. In essence, the kicker cam assembly consists of two cams carried in an appropriate housing disposed at the rear of the upper surface of each knitting head, one cam being on one side of the transverse axis of the head and the other cam being on the other side of that axis, which cams are independently projectable and retractable towards and away from the upper ends of each series of kicker fingers.

Figure 18:
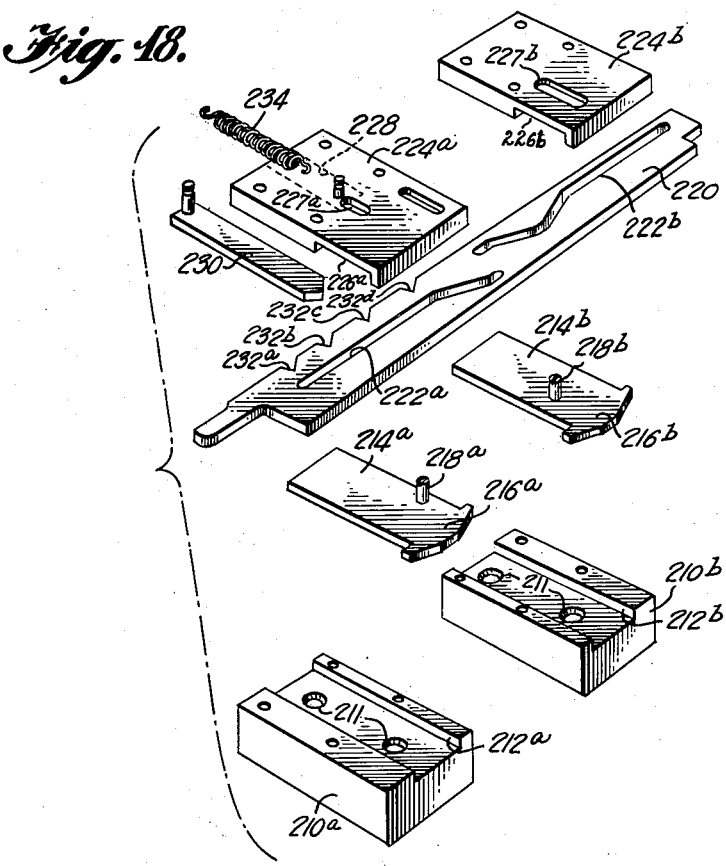
FIG. 18 is an exploded view of the kicker cam assembly.

Referring more particularly to FIGS. 7, 11–14, and 18, there is disposed on the upper surface of each knitting head 48, 48' adjacent the rear end thereof a housing 210, 210' preferably in two parts 210a and 210b, one post on each side of square-headed stud 74 and graduated dial 76, which are secured to the knitting head in any desired manner as by counter-sunk screws, the apertures 211 for which can be seen in FIG. 18. Housings 210a and 210b are in the form of rectangular blocks, each having in the upper face thereof a recessed guideway 212a and 212b. There are arranged in the guideways thus provided slides 214a and 214b, the outer ends of which are in the shape of a truncated pyramid as at 216a and 216b and function as cam surfaces. The slide 214a carries an upwardly projecting pin 218a while the slide 214b carries an upwardly projecting pin 218b. Superimposed upon the housings and their respective slides for longitudinal sliding movement is a slide bar 220 provided on one half with a curved slot 222a and on the other with a curved slot 222b, which slots are respectively adapted to engage the pins 218a and 218b. The curvature of the slots 218a and 218b is such that when slide bar 220 is in one position, one of the cam slides will be projected and the other retracted while when the slide bar is at another position, the other of the cam slides will be projected and the first retracted. In other words, through a suitably designed pin and slot connection, slide bar 220 is adapted to individually control the position of the two cam slides 214a and 214b. If desired, other positions may be provided at which both cams are retracted or projected. Slide 220 is retained on the assembly by means of a cover plate 224, again preferably in two sections, 224a and 224b, which are recessed on their respective underfaces to receive the slide bar as at 226a and 226b.

Figure 19:
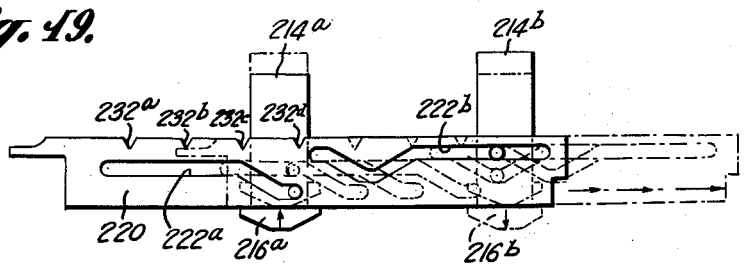
FIG. 19 is a detailed view of the cam slides and operating slides of the kicker cam assembly, showing the manner of controlling the position of the cam slides by lateral movement of the operating slide.

To illustrate how the position of the cam slides may be controlled by the curvature of slots 222a, 222b, (FIG. 19) when the detent engages notch 232a when the slide is at the extreme right, both cams will be retracted; on moving the slide to the left to engage notch 232b, cam 216b is projected and cam 216a retracted; on moving the slide still further to the left to engage notch 232c, both cams are again retracted; and on moving the slide to its extreme left position to engage notch 232d, cam 216a is projected and cam 216b retracted. The sequence may, of course, be varied at will. Cover plates 224a and 224b are secured to the housing blocks 210a and 210b as by screws and are formed at suitable locations thereon with elongated slots 227a and 227b into which the upper ends of pins 218a and 218b, respectively, project. For the purpose of retaining slide bar 220 in one or more predetermined longitudinal positions, the undersurface of one of the cover plates may be formed with a transverse recess 228 communicating with the other recess therein, a detent 230 being disposed for sliding movement in recess 228 and biased into engagement with suitable notches 232 provided along one edge of slide bar 220 by means of a spring 234.

As a particular course of yarn is being knitted during the knitting operation, slide 220 of the kicker cam assembly is placed in such a position that the slide cam of the assembly on the leading side of the knitting head is in projected position, extending rearwardly beyond the exterior of the kicker cam assembly housing. When projected, the cam will engage those selected kicker fingers which are held in projected position (see FIG. 13) due to engagement of the corresponding positioning fingers with teeth on the pattern strips carried by the pattern drums. FIG. 14 shows a projected or pre-set kicker finger in the act of being contacted by a kicker cam and it will be observed that the effect of the cam is to cause the kicker finger to swing around the supporting rod 188, pushing corresponding needles forward with respect to the needle bed a distance corresponding to the throw of the toe 199 of the kicker finger under the action of the kicker cam. This distance is sufficient to elevate the butts 39 of these needles to a point at which the butts will be engaged by the main lift cam of the needle cam array carried on the underface of the knitting head as the knitting head continues with its traverse of the needle bed, displacing the needles upwardly in the bed to the full extent and in position to engage the thread (see FIG. 15). On the other hand, those kicker cams which remain in retracted position due to the absence of teeth on the pattern strip for engagement with the associated strip contacting fingers, remain outside the path of the projected kicker cam and the corresponding needles of the needle bed remain in fully depressed position. The butts of these needles are therefore below the level of the main lift cam of the knitting head and these needles are excluded from the knitting operation (see left side FIG. 6). By providing bumper pins at suitable locations in the side frame of the machine similar to pins 122, 122' used in connection with the slides of the knitting head, it is possible to have the position of slide 220 automatically controlled to always maintain the leading cam in projected position and the following cam in retracted position in accordance with the particular head which is actually engaged in knitting as well as in accordance with the direction of travel of that head.

If desired, additional kicker cams may be incorporated in the kicker cam assembly together with additional slides for controlling their operation as may be desirable for certain purposes, such as back and forth knitting on one bed or the insertion of elastic thread by floating the thread in the hooks of needles without actually knitting such needles. It is also within the scope of this invention to vary the vertical location of the kicker cams within the housing with respect to the pivot axis of the kicker fingers in order to adjust the throw of these fingers and therefore the extent that corresponding needles are displaced in the needle bed.

Those skilled in the art will appreciate that the invention is applicable to furcated articles other than gloves, for example, divided toe hosiery known as "tabis" and that various alterations or modifications in the component parts, their arrangement and operation may be made without departure from the spirit of the invention.

Moreover, the machine of the invention is not necessarily limited to the production of furcated articles, but is adaptable for use in knitting other articles, as where special effects, such as patterning of a plurality of threads, is desired.

Having thus described my invention, what is claimed as new and desired to be secured by Letters Patent is:

1. In a knitting machine of the type having two parallel slotted beds with needles disposed in each bed, the improvement which comprises at least one pair of needles mounted in each bed, each such pair of needles being closely spaced without a sinker intervening therebetween, sinkers being present between all needles other than the needles of each such pair, and means adapted to actuate the needles in each such pair selectively and individually during knitting.

2. A machine as in claim 1 wherein said means for actuating said needles includes a pattern mechanism associated with each of said beds for selectively and individually engaging said needles in and disengaging said needles from a knitting operation, whereby the needles of said pairs of needles may be actuated simultaneously to draw a single common stitch or one at a time to draw a separate stitch.

3. A machine as in claim 1 adapted for knitting an article having at least two furcations wherein at least one of such pair of needles is mounted in each bed at locations adjacent the locus of the crotch points between said furcations.

4. A machine as in claim 1 wherein the means for actuating said needles comprises a knitting head operatively associated with each bed for traversing movement with respect thereto, each of said knitted heads including a lift cam and a draw down cam for engaging projections on said needles to reciprocate said needles during knitting to draw stitches, and wherein the projection on the needle of each pair of needles which is leading with respect to the direction of knitting is foreshortened compared to the projection on the other needle of each pair and a step is formed on the leading edge of said draw down cam along a locus spaced from the normal leading edge a distance equal to the distance between the center axes of said pairs of needles, said step being adapted to pass over the foreshortened projection and to contact said normal projection, whereby the projections of each pair of needles are contacted simultaneously to draw down said pairs as a unit.

5. In a knitting machine for knitting bifurcated articles, said machine being of the type having two opposed parallel slotted beds with needles disposed in said beds, the improvement which comprises at least one pair of needles mounted in a single slot in each bed at locations adjacent the locus of the crotch between said furcations, the slots at said locations being enlarged to receive said pairs of needles, each of said pairs of needles being separated by a thin removable divider strip extending between the needles substantially the entire length of the needles, the remaining slots containing a single operative needle, and a pattern mechanism associated with each of said beds for selectively and individually engaging and disengaging the needles in said beds, including the pairs of needles, from the knitting operation.

6. A knitting machine as in claim 5 wherein each of said divider strips includes a downwardly directed projection in engagement with said bed to restrain said strips against longitudinal movement.

7. A knitting machine as in claim 6 wherein said bed includes a recess for engagement with the projection on said divider.

8. A knitting machine as in claim 5 including a knitting head operatively associated with each bed for traversing movement with respect thereto, said head carrying knitting cams including a preliminary aligning cam and a stitch-forming cam for engagement with projections on the needles on the corresponding bed, said aligning and stitch-forming cams being adapted to be maintained with the adjacent ends thereof in spaced apart relationship, and said pattern mechanism includes means individual to each needle for engaging said needle and displacing the same within the bed a distance at least equal to that separating the adjacent ends of said cams whereby the projections of needles so displaced are contacted by said stitch-forming cam to knit stitches during a knitting operation, the needles not so displaced being free of contact with said stitch-forming cam and remaining disengaged from the knitting operation.

9. A knitting machine as in claim 8 wherein said pattern mechanism includes a plurality of fingers, one for each needle on said bed, adapted to engage said needles to displace the same within said bed, said fingers being mounted for pivotal movement and limited bodily movement to and from a projected position at which pivotal movement thereof causes displacement of the corresponding needles from and to a retracted position at which pivotal movement thereof is ineffective to displace said needles, means for individually and selectively moving said fingers to and from said projected position from and to said retracted position, and cam means associated with said knitting head in leading relationship to said stitch-forming cam on said head for pivoting said fingers during the traverse of said head to cause those fingers in projected position to displace corresponding needles within said bed to a position adapted for contact by said stitch-forming cam.

10. A knitting machine as in claim 9 wherein said finger moving means includes a plurality of positioning fingers, one for each needle-engaging finger, mounted for limited pivotal movement to and from an operative position from and to an inoperative position, said positioning fingers being adopted to engage said needle-engaging figners and, when in operative position, to maintain corresponding needle-engaging fingers in projected position, and means for individually and selectively pivoting said positioning fingers to and from operative position from and to operative position.

11. A knitting machine as in claim 10 wherein said positioning finger pivoting means comprises a pattern drum carrying around its periphery a plurality of pattern strips, corresponding to the courses of the article to be knitted, each said strip having grooves and lands thereon in accordance with, respectively, those needles to be engaged in and those to be disengaged from knitting in the course to which the strip corresponds, said grooves and lands being adapted to contact the positioning fingers and locate corresponding fingers in operative and inoperative position, and means operated in timed relation to the traverse of said head to rotate said drum step-by-step and bring successive strips into contact with said positioning fingers just prior to the traverse of the head to knit corresponding courses.

12. In a knitting machine for knitting a tubular glove including tubular extensions thereon for thumb and fingers, in combination, two opposed parallel beds each having a plurality of transverse slots on the upper surface thereof for the reception of needles, at least one of said slots on each bed adjacent the location corresponding to each of the crotch points between each two contiguous tubular extensions on the glove to be knitted being enlarged; knitting needles disposed in the slots of said beds; there being two of said needles disposed in each of the enlarged slots, said two needles being separated by a thin divider strip removably arranged in the corresponding slot and extending between the adjacent needles along at least a major portion of their entire length; sinkers adjacent each of the mutually facing ends of said beds, said sinkers being arranged between the slots of said beds and cooperating with said needles in said slots to form knitted stitches, means on each bed for actuating said needles and associated sinkers to form stitches during knitting, and means associated with each bed for individually disengaging selected needles on said bed from the knitting operation as each course of the article is knitted.

13. In a continuous method of knitting a tubular furcated article in a knitting machine having opposed parallel beds of needles, the improvement which comprises the steps of arranging on each bed adjacent groups of single needles corresponding to the furcations of the article to be knitted and at least one pair of double needles between each two adjacent groups, the locations of each of said pairs of double needles generally coinciding with a crotch point between furcations of the article to be knitted; knitting the unfurcated portion of said glove up to the transverse level of a crotch point utilizing the groups of single needles and at least one needle of each pair of double needles; preparatory to forming the first of the tubular furcation plus the pairs of double needles at the crotch at least the groups of single needles corresponding to said furcation plus the pair of double needles at the crotch point, each of said pairs of double needles during said course being actuated as a unit to draw a common stitch therewith; forming said first tubular furcation by knitting on each bed the group of single needles corresponding thereto plus a needle of the pairs of double needles at the crotch point, which needle is separated from said group of single needles by another needle of the pairs of double needles, while maintaining said last-mentioned needle disengaged from the knitting operation to hold a stitch thereon; after the completion of the first furcation, casting off the stitches of the last course of yarn of the furcation from the needles on which the stitches were formed; and forming the next furcation by knitting on each bed the group of single needles corresponding to said next furcation plus the needle of the pairs of needles at the crotch point which was maintained inactive after being knit as a unit with another double needle while maintaining inactive the needles cast free of stitches.

14. The method of claim 13 wherein during the formation of said unfurcated portion of said article, each pair of double needles is knit as a unit whereby common stitches are drawn thereby in every course of said unfurcated portion and are present on said pairs of needles when the level of said crotch point is reached.

15. The method of claim 14 wherein in at least the last two courses of said unfurcated portion prior to beginning said first furcation, the needles of said pairs of double needles are knit in alternation, one in each of said two courses, whereby distinct separate stitches are formed on said needles preparatory to knitting the first furcation at said crotch point.

16. The method of claim 13 wherein at least two pairs of double needles are arranged between each two adjacent groups of single needles on each bed and the needle of each pair on each bed at the crotch of the first furcation nearest the group of single needles corresponding to said first furcation is knitted with said group during the formation of the first furcation, the needle of each pair remote from said group being maintained inactive, and said remote needle is knitted during the formation of said second furcation with the group of single needles corresponding to said second furcation.

17. The method of claim 13 wherein a single pair of double needles is arranged between each two adjacent groups of single needles on each bed and the group of single needles on each bed corresponding to the first furcation is knitted together with the needle of said pair remote from that group during the formation of the first furcation, the other needle being maintained inactive, and said other needle of each pair on each bed is knitted during the formation of the second furcation with the group of single needles corresponding to said second furcation.

18. The method of claim 13 wherein one needle of each of said pairs of double needles is knitted along with the groups of single needles during the formation of said unfurcated portion, the other needle of each of said pairs being maintained inactive; preparatory to forming the first furcation said pairs of needles at the crotch point of the first furcation are knitted as units together with the groups of single needles corresponding to said first furcation, whereby at least a half-stitch is placed on the needles of said pairs of double needles at said crotch point; during the formation of said first furcation, the groups of single needles corresponding to said first furcation are knitted together with the one needle of the pairs of double needles at said crotch point which was knitted as the unfurcated portion was formed, the other needles of said pairs at said crotch point being held inactive; and during the formation of said second furcation, the groups of needles corresponding to the second furcation are knitted together with the originally inactive needles of said pairs of double needles at said crotch point.

19. The method of claim 18 wherein said pairs of double needles at said crotch point are knitted as units along with the groups of single needles corresponding to said first furcation as the first course of said first furcation is added to the last course of said unfurcated portion.

20. The method of claim 19 wherein during the knitting of the second course of said first furcation, the originally inactive needles of said pairs at said crotch point are knitted independently of the originally active needles thereof together with the groups of single needles corresponding to said bed, the originally active needles thereof being maintained inactive during this course; and during the third and subsequent courses of said first furcation, said originally active needles of said pairs at said crotch point are knitted together with the groups of single needles corresponding to said first furcation, said originally inactive needles being again maintained inactive during these courses.

21. A method of continuous knitting on a knitting machine having opposed parallel beds of needles, a glove having tubular digit extensions, at least one tubular hand portion extension adjacent at least one of said digit extensions, and crotch points between each hand portion extension and the adjacent digit extension and between each two adjacent digit extensions, the crotch point peculiar to the hand portion extensions being at a different level transversely of said glove from the levels of said other crotch points, which method comprises the steps of arranging on said bed groups of spaced apart single needles corresponding to the digit extensions of the glove with a sinker between each adjacent pair of said single needles and at least one pair of needles between each two adjacent groups of single needles on each bed, which pair of needles are substantially more closely spaced together than adjacent pairs of said single needles and are free of a sinker therebetween; forming the portion of the glove up to the level of the crotch point between a digit extension and a hand portion extension by knitting on all of said groups of single needles plus at least one needle of each of said pairs of closely spaced needles and in at least the last course of said portion before the level of the crotch point, knitting all of said groups of single needles plus at least the other needle of each of said pairs at at least this crotch point; forming said digit extension by knitting courses on the single needles of the groups corresponding thereto plus one needle on each bed of the pairs of double needles at this crotch point, which one needle is spaced from the group of single needles on the same bed corresponding to said digit extension by another needle of said pairs of needles, said other needle being disengaged from knitting as said first digit extension is knitted; upon the completion of said first digit extension, casting off the last course thereof from the needles on which it was formed; forming said hand portion extension by knitting courses on the groups of single needles corresponding to the remaining digit extensions, the said other needles at said first-mentioned crotch point, and at least one needle on each bed of the pairs of needles at the remaining crotch points; and in at least the last course of said extension before the levels of said other crotch points, knitting at least the other needle of each of said pairs along with said groups of single needles, whereby at least a half-stitch is present on each needle of said pairs immediately prior to beginning the next digit extension; forming each of said digit extensions in the same manner as said first digit extensions in the same manner as said first digit extension, beginning with an extension at an end of the hand portion extension, and as each extension is completed, knitting the extension next adjacent thereto, the last coure of each extension being cast off from the needles on which it was formed.

22. A continuous method of knitting needles on opposed parallel beds to form an article having a crotch between at least two tubes which method comprises the steps of arranging on each bed at least one pair of needles between each two groups of needles corresponding to said tubes, the needles of said pair being substantially more closely spaced than adjacent pairs of needles in said groups and being free of an intervening sinker, sinkers being located between all other adjacent pairs of needles of said groups on said beds; forming said article up to said crotch point by knitting courses of yarn on said groups of single needles plus at least one needle of each of said pairs, only one stitch being drawn by needles of each said pair in any one course, both of the needles of each pair being provided with at least a half stitch thereon by the time said crotch point is reached; forming the first tube by knitting courses of yarn on the needles of the groups corresponding to said tube plus one needle of each pair, the remaining needle of each pair being disengaged from knitting; upon completion of the last course of said first tube, casting off the stitches thereof from the needles actively engaged in the formation thereof, such needles being thereafter disengaged from knitting; and then forming the second tube by knitting courses of yarn upon the groups of needles corresponding to the second course plus the needle of each pair which was not used in the formation of the first tube, whereby at least one extra wale is introduced into said article beginning at said crotch point.

23. The method of claim 22 wherein at least one needle on each bed of the needles of the pairs at the crotch point utilized for forming each tube is separated from the group of needles on the same bed utilized for forming that tube by a needle of the pairs which is disengaged during the formation of that tube.

24. In a continuous method of knitting a bifurcated article on a knitting machine having two opposed straight beds of needles which comprises the steps of arranging on each bed two groups of needles corresponding to the furcations of the article being knit, at least the last needle of the first group on each bed overlapping with the first needle of the second group on said bed, whereby said first needle of the second group intervenes between the ultimate and penultimate needles of the first group, and providing a sinker between each adjacent pair of needles of said groups except between each overlapping needle of each group and the directly adjacent needle of the second group with which it overlaps, whereby at least one pair of overlapping needles free of an intervening sinker is present on each bed, said pairs of overlapping needles corresponding generally to the locus of the division between the furcations of said article; maintaining not more than one needle of each pair of overlapping needles disengaged from knitting while knitting courses of yarn on said groups, only one stitch being drawn by the needles of each pair utilized as such courses are knit, and in at least the last course preparatory to forming the first furcation utilizing for knitting at least any needle of each pair not engaged in the knitting of previous courses; knitting the courses of the first furcation upon the non-overlapping needles of the first groups plus one needle of each pair of overlapping needles, the other needle of each pair of overlapping needles being disengaged from knitting, upon the completion of the first furcation casting off the stitches of the last course thereof from the corresponding needles; and then forming the second furcation by knitting courses on the non-overlapping needles of said second groups plus the needle of each pair disengaged during the knitting of the first furcation.

25. The method of claim 24 wherein the pairs of overlapping needles are spaced substantially closer together than the distance separating any two adjacent non-overlapping needles.

26. The method of claim 24 wherein at least one overlapping needle on each bed of those used in forming each furcation is separated from the non-overlapping needles on that bed also used in forming the furcation by an overlapping needle which is disengaged during the formation of that furcation.

27. The method of claim 24 wherein each of said pairs of overlapping needles is knit as a unit to draw a single common stitch in at least the last course prior to the first course of said first furcation.

References Cited in the file of this patent

UNITED STATES PATENTS

| | | |
|---|---|---|
| 47,354 | Carey | Apr. 18, 1865 |
| 2,038,895 | Di Fonzo | Apr. 28, 1936 |